United States Patent
Cui et al.

(10) Patent No.: US 9,621,294 B2
(45) Date of Patent: Apr. 11, 2017

(54) ENHANCEMENT OF INTER-CELL INTERFERENCE COORDINATION WITH ADAPTIVE REDUCED-POWER ALMOST BLANK SUBFRAMES BASED ON NEIGHBOR CELL PROFILE DATA

(71) Applicants: AT&T Intellectual Property I, L.P., Atlanta, GA (US); AT&T Mobility II LLC, Atlanta, GA (US)

(72) Inventors: Zhi Cui, Sugar Hill, GA (US); Cheng P. Liu, Johns Creek, GA (US); Hongyan Lei, Plano, TX (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 91 days.

(21) Appl. No.: 14/505,129

(22) Filed: Oct. 2, 2014

(65) Prior Publication Data

US 2016/0099791 A1    Apr. 7, 2016

(51) Int. Cl.
*H04W 36/04* (2009.01)
*H04W 36/22* (2009.01)
(Continued)

(52) U.S. Cl.
CPC .......... *H04J 11/0053* (2013.01); *H04B 7/024* (2013.01); *H04W 72/1226* (2013.01); *H04W 72/1278* (2013.01); *Y02B 60/50* (2013.01)

(58) Field of Classification Search
CPC ..... H04W 36/04; H04W 36/22; H04W 36/32; H04W 48/06; H04W 48/20;
(Continued)

(56) References Cited

U.S. PATENT DOCUMENTS 4,737,978 A    4/1988  Burke et al.
5,515,419 A    5/1996  Sheffer
(Continued)

FOREIGN PATENT DOCUMENTS

CN    102907121 A    1/2013
EP    1161802 B1    5/2008
(Continued)

OTHER PUBLICATIONS

Beming et al. "LTE-SAE architecture and performance." Ericsson Review No. 3, 2007, pp. 98-104.
(Continued)

*Primary Examiner* — Ayaz Sheikh
*Assistant Examiner* — Debebe Asefa
(74) *Attorney, Agent, or Firm* — Amin, Turocy & Watson, LLP

(57) ABSTRACT

An inter-cell interference coordination procedure in heterogeneous networks (HetNets) is enhanced based on utilization of cell profile data associated with neighbor access points to improve HetNet spectrum efficiency, mobility performance, and/or overall network capacity. In one aspect, a macro access point can receive cell profile data associated with neighbor access points and modify a power level of reduced-power almost blank subframes (ABS) transmitted by the macro access point to manage macro cell capacity. Further, the macro access point can configure the ABS pattern and transmit the ABS pattern to the neighbor access points. Based on the ABS pattern, the neighbor access points can schedule transmissions to user equipment that are located at (or close to) their cell-edge to reduce inter-cell interference.

20 Claims, 11 Drawing Sheets

(51) Int. Cl.
*H04W 36/32* (2009.01)
*H04W 48/20* (2009.01)
*H04W 72/12* (2009.01)
*H04B 7/02* (2006.01)
*H04J 11/00* (2006.01)
*H04B 7/024* (2017.01)

(58) Field of Classification Search
CPC .......... H04W 72/1224; H04W 72/1278; H04B 7/024; Y02B 60/50; H04J 11/0053
See application file for complete search history.

(56) References Cited

U.S. PATENT DOCUMENTS

| | | | |
|---|---|---|---|
| 5,577,168 | A | 11/1996 | Haas et al. |
| 5,854,981 | A | 12/1998 | Wallstedt et al. |
| 5,953,667 | A | 9/1999 | Kauppi |
| 6,167,274 | A | 12/2000 | Smith |
| 6,289,220 | B1 | 9/2001 | Spear |
| 6,360,094 | B1 | 3/2002 | Satarasinghe |
| 6,445,917 | B1 | 9/2002 | Bark et al. |
| 6,839,565 | B2 | 1/2005 | Sarkkinen et al. |
| 7,130,627 | B2 | 10/2006 | Lundh et al. |
| 7,283,816 | B2 | 10/2007 | Fok et al. |
| 7,298,327 | B2 | 11/2007 | Dupray et al. |
| 7,369,861 | B2 | 5/2008 | Vare |
| 7,555,300 | B2 | 6/2009 | Scheinert et al. |
| 7,812,766 | B2 | 10/2010 | Leblanc et al. |
| 7,817,997 | B2 | 10/2010 | Nylander et al. |
| 7,995,988 | B2 | 8/2011 | Filizola et al. |
| 8,032,153 | B2 | 10/2011 | Dupray et al. |
| 8,169,931 | B2 | 5/2012 | Hui et al. |
| 8,185,124 | B2 | 5/2012 | Antic et al. |
| 8,194,579 | B2 | 6/2012 | Lee et al. |
| 8,254,982 | B2 | 8/2012 | Kuningas |
| 8,265,618 | B2 | 9/2012 | MacNaughtan et al. |
| 8,306,540 | B2 | 11/2012 | Hsieh et al. |
| 8,311,001 | B2 | 11/2012 | Kimura et al. |
| 8,325,684 | B2 | 12/2012 | Pani et al. |
| 8,331,939 | B2 | 12/2012 | Chen |
| 8,358,982 | B2 | 1/2013 | Van Der Velde et al. |
| 8,401,544 | B2 | 3/2013 | Fried et al. |
| 8,422,956 | B2 | 4/2013 | Narasimha et al. |
| 8,467,351 | B2 | 6/2013 | Liu et al. |
| 8,543,123 | B2 | 9/2013 | Moon et al. |
| 8,571,594 | B2 | 10/2013 | Luo et al. |
| 8,576,742 | B2 | 11/2013 | Yoo et al. |
| 8,582,530 | B2 | 11/2013 | Binzel et al. |
| 8,594,011 | B2 | 11/2013 | Wang et al. |
| 8,615,199 | B2 | 12/2013 | Han et al. |
| 8,755,316 | B2 | 6/2014 | Aschan et al. |
| 8,914,028 | B2 * | 12/2014 | Gayde ................... H04W 48/06 455/436 |
| 8,977,268 | B2 * | 3/2015 | Sivanesan et al. .......... 455/436 |
| 9,008,659 | B1 | 4/2015 | Choi et al. |
| 9,185,620 | B2 * | 11/2015 | Khoryaev ............. H04W 24/10 |
| 2007/0287444 | A1 | 12/2007 | Hulkkonen et al. |
| 2009/0067386 | A1 | 3/2009 | Kitazoe |
| 2009/0098885 | A1 | 4/2009 | Gogic et al. |
| 2009/0137249 | A1 | 5/2009 | Horn et al. |
| 2010/0184434 | A1 | 7/2010 | Jeong et al. |
| 2010/0234061 | A1 | 9/2010 | Khandekar et al. |
| 2011/0039575 | A1 | 2/2011 | Castillo et al. |
| 2011/0064059 | A1 | 3/2011 | Hooli et al. |
| 2011/0188481 | A1 | 8/2011 | Damnjanovic et al. |
| 2011/0216732 | A1 | 9/2011 | Maeda et al. |
| 2011/0249642 | A1 | 10/2011 | Song et al. |
| 2011/0270994 | A1 | 11/2011 | Ulupinar et al. |
| 2011/0294527 | A1 | 12/2011 | Brueck et al. |
| 2011/0319028 | A1 | 12/2011 | Rangaiah et al. |
| 2011/0319110 | A1 | 12/2011 | Futaki |
| 2012/0014333 | A1 | 1/2012 | Ji et al. |
| 2012/0033570 | A1 | 2/2012 | He et al. |
| 2012/0113812 | A1 | 5/2012 | Ji et al. |
| 2012/0115469 | A1 | 5/2012 | Chen et al. |
| 2012/0149362 | A1 | 6/2012 | Tooher et al. |
| 2012/0157082 | A1 | 6/2012 | Pedersen et al. |
| 2012/0282864 | A1 | 11/2012 | Dimou et al. |
| 2013/0033998 | A1 | 2/2013 | Seo et al. |
| 2013/0077553 | A1 | 3/2013 | Nielsen et al. |
| 2013/0142110 | A1 | 6/2013 | Li et al. |
| 2013/0165142 | A1 | 6/2013 | Huang |
| 2013/0170362 | A1 | 7/2013 | Futaki et al. |
| 2013/0196675 | A1 | 8/2013 | Xiao et al. |
| 2013/0217385 | A1 | 8/2013 | Das et al. |
| 2013/0223393 | A1 | 8/2013 | Jung et al. |
| 2013/0225169 | A1 | 8/2013 | Farnsworth et al. |
| 2013/0244709 | A1 | 9/2013 | Davydov et al. |
| 2013/0267230 | A1 | 10/2013 | Lin et al. |
| 2013/0315092 | A1 | 11/2013 | Yu et al. |
| 2013/0315157 | A1 | 11/2013 | Krishnamurthy et al. |
| 2013/0343315 | A1 | 12/2013 | Tiirola et al. |
| 2014/0135028 | A1 | 5/2014 | Wang et al. |
| 2014/0198744 | A1 | 7/2014 | Wang et al. |
| 2015/0038140 | A1 | 2/2015 | Kilpatrick, II et al. |
| 2015/0264622 | A1 | 9/2015 | Ueda |

FOREIGN PATENT DOCUMENTS

| | | |
|---|---|---|
| EP | 2132949 A1 | 12/2009 |
| EP | 2575391 A1 | 4/2013 |
| EP | 2688352 A1 | 1/2014 |
| EP | 2749077 A1 | 7/2014 |
| GB | 2494107 A | 3/2013 |
| GB | 2498927 A | 8/2013 |
| JP | 2011244435 A | 12/2011 |
| JP | 2012044658 A | 3/2012 |
| JP | 2012105176 A | 5/2012 |
| JP | 2013038720 A | 2/2013 |
| WO | 2008055132 A2 | 5/2008 |
| WO | 2010151016 A2 | 12/2010 |
| WO | 2011136565 A2 | 11/2011 |
| WO | 2012015411 A1 | 2/2012 |
| WO | 2012024454 A1 | 2/2012 |
| WO | 2012140470 A1 | 10/2012 |
| WO | 2013066877 A1 | 5/2013 |
| WO | 2013138988 A1 | 9/2013 |
| WO | 2013185354 A1 | 12/2013 |

OTHER PUBLICATIONS

Nandini Deb. "An Internship Experience Report on Heterogeneous Networks." Amity Institute of Telecom Technology & Management, Internship With Sabs KPO Solutions Pvt. Ltd., May-Jul. 2013, 94 pages.
Holma et al. "LTE for UMTS—OFDMA and SC-FDMA Based Radio Access." John Wiley & Sons, Ltd., 2009, 450 pages.
Holma et al. "LTE for UMTS Evolution to LTE-Advanced" Second Edition. John Wiley & Sons, Ltd., 2011, 559 pages.
Reed et al. "Spectrum Access Technologies: The Past, the Present, and the Future." Proceedings of the IEEE |vol. 100, May 13th, 2012, pp. 1676-1684.
Schwarz et al. "Pushing the Limits of LTE: A Survey on Research Enhancing the Standard." IEEE Access, vol. 1, May 10, 2013, pp. 51-62.
Siddiqui et al. "Broadband Wireless Technologies." Next-Generation Wireless Technologies, Computer Communications and Networks 2013. pp. 71-103.
Vetter et al. "Enablers for Energy-Aware Cooperative Decision and Control." FP7 Information & Communication Technologies (ICT), COoperative aNd Self growing Energy awaRe Networks—CONSERN, Oct. 31, 2010, 56 pages.
"Backhauling X2." Cambridge Broadband Networks Limited, Dec. 4, 2010, 13 pages.
Cackov et al. "Simulation and Performance Evaluation of a Public Safety Wireless Network: Case Study." Simulation, vol. 81, Issue 8, Aug. 2005, pp. 571-585.
Dietl et al."Location Information Service for Heterogeneous Mobile Networks—Location Trader Project." Center for Digital Technology and Management, 2006, 89 pages.

(56) References Cited

OTHER PUBLICATIONS

Zerfos et al. "DIRAC: A Softwarebased Wireless Router System." MobiCom'03, Sep. 14-19, 2003, 15 pages.
Wang et al. "Intersystem Location Update and Paging Schemes for Multitier Wireless Networks." 2000, MOBICOM 2000, pp. 99-109.
Zeng et al. "Worldwide Regulatory and Standardization Activities on Cognitive Radio." 2010 IEEE Symposium on New Frontiers in Dynamic Spectrum, Apr. 6-9, 2010, 9 pages.
Berger et al. "On the Advantages of Location Resolved Input Data for Throughput Optimization Algorithms in Self-Organizing Wireless Networks." Proceedings of the WS-BWA IEEE Global Communications Conference 2011 (GLOBECOM'13), Atlanta, GA, Sep. 12, 2013, 5 pages.
He et al. "An Optimal Approach for Load Balancing in Heterogeneous LTE Advanced." Third Nordic Workshop on System & Network Optimization for Wireless, Apr. 10-12, 2012, 1 page.
Ilmenau University of Technology. "Load Balancing." International Graduate School on Mobile Communications. published online at [http://www.tu-ilmenau.de/fileadmin/public/iks/files/lehre/UMTS/CellCommNets_SONLTE_WS13_part2.pdf], retrieved Feb. 12, 2014, IEEE 72nd Vehicular Technology Conference (VTC2010-Fall) (Ottawa, Canada, 2010). 19 pages.
Lobinger et al. "Load Balancing in Downlink LTE Self-Optimizing Networks." 2010 IEEE 71st Vehicular Technology Conference (VTC 2010-Spring), May 16-19, 2010, 5 pages.
Rosenberger et al. "Ruled-based Algorithms for Self-x Functionalities in Radio Access Networks." 2009, ICT-MobileSummit 2009 Conference Proceedings, 8 pages.
Siomina et al. "Load balancing in heterogeneous LTE: Range optimization via cell offset and load-coupling characterization" 2012 IEEE International Conference on Communications (ICC), Jun. 10-15, 2012, pp. 1357-1361.
"LTE Advanced: HetNet eICIC/IC," qualcomm.com. 2013. Published online at [http://www.qualcomm.com/research/ projects/lte-advanced/hetnets], retrieved on Jul. 15, 2014, 2 pages.
"A Comparison of LTE Advanced HetNets and WiFi," Qualcomm Incorporated, Oct. 2011, published online at [http://www.qualcomm.com/media/documents/comparison-lte-advancedhetnets-and-wifi], Retrieved on Jul. 15, 2014, 16 pages.
Ghadialy, "Further enhanced Inter-Cell Interference Coordination (FeICIC)," The 3G4G Blog, May 1, 2014. published online at [http://blog.3g4g.co.uk/2014/05/further-enhanced-inter-cell.html], retrieved on Jul. 15, 2014, 9 pages.
Seymour, "Essential Elements of Rel-10 and Rel-11 LTE-Advanced," LTE-Advanced: Understanding 3GPP Release 10 and Beyond, Workshop presented by 4G Americas, Presentation Slide, Oct. 22, 2012, Alcatel-Lucent. published online at [http://www.4gamericas.org/UserFiles/file/Presentations/Essential%20Elements%20of%20Rel-10%20and%20Rel-11%20LTE%20Advanced%20Jim%20Seymour%20Alcatel-Lucent.pdf], retrieved on Jul. 22, 2014, 13 pages.
Merwaday, et al., "Capacity Analysis of LTE-Advanced HetNets with Reduced Power Subframes and Range Expansion," arXiv preprint arXiv:1403.7802, 2014. published online at [http://arxiv.org/pdf/1403.7802], retrieved on Jul. 22, 2014, 34 pages.
Li, et al, "CoMP and interference coordination in heterogeneous network for LTE-Advanced," Globecom Workshops, IEEE, 2012, 5 pages.
Jungnickel, et al. "The Role of Small Cells, Coordinated Multi-Point and Massive MIMO in 5G" published online at [https://www.metis2020.com/wpcontent/uploads/publications IEEE_2014_Jungnickel_etal_Small_cells_in_5G.pdf], retrieved Jul. 21, 2014, 11 pages.
Non-Final Office Action mailed Mar. 10, 2016 for U.S. Appl. No. 14/261,666, 41 pages.
Non-Final Office Action mailed Mar. 17, 2016 for U.S. Appl. No. 14/261,696, 48 pages.
Final Office Action mailed Jul. 14, 2016 for U.S. Appl. No. 14/261,666, 23 pages.

\* cited by examiner

ENHANCEMENT OF INTER-CELL INTERFERENCE COORDINATION WITH ADAPTIVE REDUCED-POWER ALMOST BLANK SUBFRAMES BASED ON NEIGHBOR CELL PROFILE DATA

TECHNICAL FIELD

The subject disclosure relates to wireless communications, e.g., to an enhancement of inter-cell interference coordination with adaptive reduced-power almost blank subframes (ABS) based on neighbor cell profile data.

BACKGROUND

With an explosive growth in utilization of communication devices, mobile telecommunications carriers are seeing an exponential increase in network traffic. To meet the demands of higher traffic and/or improve the end user experience, conventional systems deploy metro cells (e.g., small cells) that improve network coverage and capacity by offloading mobile traffic between overlapping cells. Metro cells can be deployed in many different ways. For example, a metro cell co-channel deployment model with macro cells can be utilized for spectrum-limited scenarios.

To mitigate interference in a heterogeneous network (Het-Net) environment an Enhanced Inter-Cell Interference Coordination (eICIC) mechanism can be utilized wherein, the macro cell avoids scheduling data in "protected" sub-frames as specified by Third Generation Partnership Project (3GPP) Release 10 (Rel-10). The protected" sub-frames of eICIC are known as "Almost blank subframes" (ABS) that do not transmit any traffic channels and mostly comprise low-power control channel frames. The macro cell can configure ABS subframes such that metro cells can communicate with their served user equipment (UE) during the ABS frames and avoid interference from macro cell. Further, a Further Enhanced Inter-Cell Interference Coordination (FeICIC) mechanism was proposed in 3GPP Release 11 (Rel-11), wherein inter-cell interference can be further reduced through cancellation of interference on common control channels of ABS caused by Common Reference Signals (CRS) of high power macro cells and critical broadcast system information can be better detected in the cell range extension region around the metro cell. However, the eICIC/FeICIC mechanisms have a negative impact on a capacity of the macro cell.

DETAILED DESCRIPTION

Figure 1:
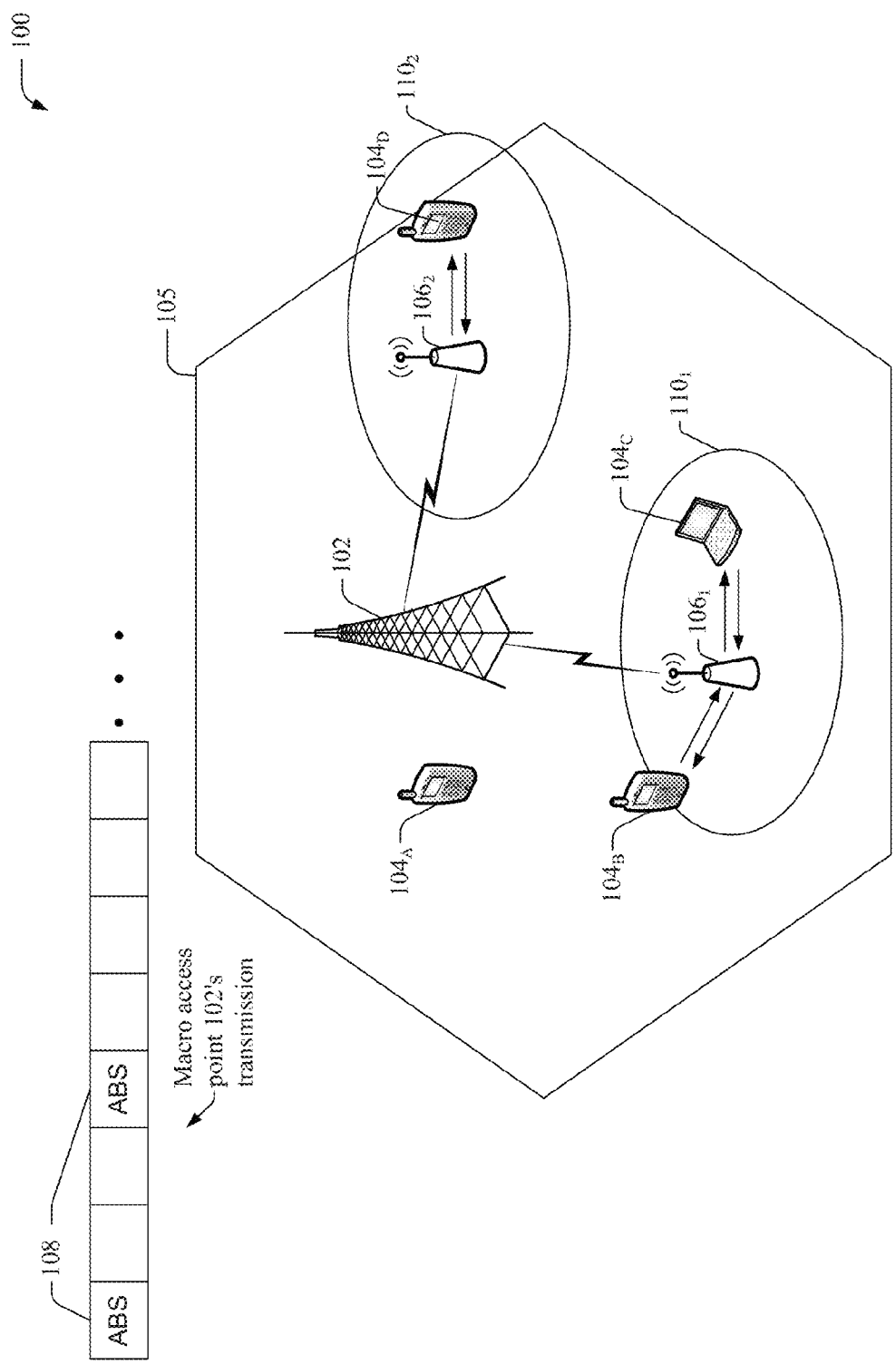
FIG. 1 illustrates an example system that improves a capacity of an access point while reducing inter-cell interference.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "node," "platform," "point," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "communication device," "mobile device," "mobile station," "mobile equipment," and similar terminology, refer to a wired or wireless device utilized by a subscriber or user of a wired or wireless communication service to receive or convey data, control, voice, video, sound, gaming, or substantially any data-stream or signaling-stream. The foregoing terms are utilized interchangeably in the subject specification and related drawings. Data and signaling streams can be packetized or frame-based flows. Furthermore, the terms "user," "subscriber," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

Heterogeneous Networks (HetNets) can include different types of access nodes/cells in a wireless network. For example, macro cells, metro cells, femtocells, and/or pico cells can be deployed within a HetNet and can have overlapping coverage areas. It can be noted that WiFi access points can also be part of a HetNet. Communication devices within the overlapping coverage areas can suffer from significant co-channel cross-tier interference. To manage this interference, mechanisms such as Enhanced Inter-Cell Interference Coordination (eICIC) and/or Further Enhanced Inter-Cell Interference Coordination (FeICIC) are utilized. The systems and methods disclosed herein facilitate enhancing FeICIC and/or eICIC to enable metro cell profile-based adaptive reduced-power almost blank subframes (ABS) setting(s). The systems and methods can significantly improve mobility performance, spectrum efficiency, and/or overall network capability of the HetNet.

As an example, aspects or features of the disclosed subject matter can be exploited in substantially any wired or wireless communication technology; e.g., Universal Mobile Telecommunications System (UMTS), WiFi, Worldwide Interoperability for Microwave Access (WiMAX), General Packet Radio Service (GPRS), Enhanced GPRS, Third Generation Partnership Project (3GPP) Long Term Evolution (LTE), Third Generation Partnership Project 2 (3GPP2) Ultra Mobile Broadband (UMB), High Speed Packet Access (HSPA), ZigBee, or another IEEE 802.XX technology. Additionally, substantially all aspects of the disclosed subject matter can be exploited in legacy (e.g., wireline) telecommunication technologies and/or future telecommunication technologies (e.g., 5G, whitespace, etc.).

Referring initially to FIG. 1, there illustrated is an example system 100 that improves a capacity of an access point while reducing inter-cell interference, according to one or more aspects of the disclosed subject matter. System 100 depicts an example heterogeneous communication network (e.g., heterogeneous network (HetNet)) that includes a macro access point 102 that serves one or more user equipment (UE) $104_A$. In addition, system 100 can include one or more neighbor metro access points ($106_1$, $106_2$), for example, that are located within a defined distance from the macro access point 102. As an example, the macro access point 102 and the one or more metro access points ($106_1$, $106_2$) can be considered as neighboring access points if the coverage area 105 of the macro access point 102 at least partially overlaps (e.g., to facilitate handover/cell reselection between the cell sites) with the coverage areas ($110_1$, $110_2$) of the one or more metro access points ($106_1$, $106_2$), if the locations of the macro access point 102 and the one or more metro access points ($106_1$, $106_2$) satisfy a defined location criterion (e.g., are within a defined distance), if the macro access point 102 and the one or more metro access points ($106_1$, $106_2$) share a common cell edge, etc. In one aspect, the macro access point 102 and/or the one or more metro access points ($106_1$, $106_2$) can be part of a self-optimizing network (SON). As an example, the access points (102, $106_1$, $106_2$) can include, but are not limited to, a base station, an eNodeB, a pico station, a WiFi access point, a femto access point, a HomeNodeB, a relay node (RN), etc.

Metro access points ($106_1$, $106_2$) are wireless access points interfaced with a wired broadband network (or wireless connection to the macro access point 102), that can be deployed to improve indoor wireless coverage, and to offload traffic from a mobility radio access network (RAN) operated by a wireless service provider. Improved coverage includes stronger signal, increased bandwidth, and improved reception (e.g., video, sound, or data), ease of session or call initiation, and session or call retention, as well. Offloading traffic from the RAN reduces operational and transport costs for the service provider since a lesser number of end users consumes macro RAN over-the-air radio resources (e.g., radio traffic channels), which are typically limited. With the rapid increase in utilization of communications networks and/or devices, mobile data communications have been continually evolving due to increasing requirements of workforce mobility, and, services provided by metro cells can be extended beyond indoor coverage enhancement.

Metro cells can further be classified into different cell types, such as, but not limited to, micro cells, pico cells, femto cells, etc. based on their different cell sizes. It is noted that the cell size of a cell can be determined based on various factors such as, but not limited to, the transmission power of its access point, coverage area, antenna position, location (e.g. rural or city, indoor or outdoor), etc. Typically, the macro access point 102 transmits long range high power signals, while the metro access points ($106_1$, $106_2$) transmit shorter range and lower power signals. To mitigate interference between the macro access point 102 and the metro access points ($106_1$, $106_2$), an eICIC/FeICIC mechanism can be utilized as specified by 3GPP Release 10 and 11. According to eICIC, the macro access point 102 can schedule and/or configure blanking of subframes (designated as Almost Blank subframes (ABS) 108) in the time domain. The metro access points ($106_1$, $106_2$) can transmit information to their served UEs during the ABS 108 to reduce interference from the macro access point 102. The subframes 108 are considered "Almost Blank" since user traffic is not transmitted during these subframes; however, minimal control traffic on the Physical downlink Control Channel (PDCCH) can still be transmitted, for example, to schedule macro uplink traffic and maintain Hybrid automatic repeat request (HARQ) acknowledgement (ACK)/ negative acknowledgement (NACK) feedback to the macro UEs (e.g., UE $104_A$). Further, to maintain backward compatibility to legacy UEs the ABS 108 can also include cell-specific reference signals (RS), synchronization signals, and/or a paging channel.

Although interference is minimized though eICIC/FeICIC, the macro cell capacity is significantly reduced since not all subframes can be utilized by the macro access point 102. To increase macro cell capacity, reduced-power ABS can be utilized by macro access point 102. With reduced-power ABS, the macro access point 102 does not completely blank the power on the ABS, and transmits user data with reduced-power, for example, to serve UEs that are close to (e.g., within a defined distance from) the macro access point 102. In one aspect, the amount of power reduction can be automatically adjusted based on cell profile data associated with the metro access points ($106_1$, $106_2$). The cell profile data can include, but is not limited to, cell-types (e.g., metro cell, small cell, pico cell, femtocell, etc.), antenna tilt/pattern/ mounting, transmission power level, multiple input multiple output (MIMO), carrier aggregation, indoor/outdoor location, capacity, performance, etc. In one example, the macro access point 102 can determine a power level by which the transmission of the macro access point 102 is to be reduced. In one aspect, data transmissions during different ABS within the same frame can utilize the same or different customized power levels. Moreover, the macro access point 102 can utilize the reduced power level (customized based on the cell profile data) to transmit user data during the ABS. Additionally or alternatively, the macro access point 102 can monitor mobility performance and/or real-time resource usage and adjust the transmission power during the reduced-power ABS.

The configuration of the ABS 108 can be represented via an ABS pattern bitmap that can be provided to the metro access points ($106_1$, $106_2$), for example, via customized operation, administration, and maintenance (OAM) and/or via an X2-interface. In one example, the macro access point 102 can utilize the cell profile data to determine ABS pattern bitmap. Based on the received ABS pattern bitmap the metro access points ($106_1$, $106_2$) can schedule data for its UEs (e.g., $104_B$-$104_D$) on subframes that overlap with the ABS 108. Although only two metro cells and four UEs (e.g., $104_A$-$104_D$) are depicted in FIG. 1, it is noted that the subject specification is not so limited and that a greater or fewer number of metro cells can be deployed within and/or have overlapping (e.g., partially or completely) coverage areas with the macro cell and/or a greater or fewer number of UEs can be served by the macro and/or metro cells. As an example, the UEs (e.g., $104_A$-$104_D$) can include most any electronic communication devices such as, but not limited to, most any consumer electronic device, for example, a tablet computer, a digital media player, a digital photo frame, a digital camera, a cellular phone, a personal computer, a personal digital assistant (PDA), a smart phone, a laptop, a gaming system, etc. Further, the UEs (e.g., $104_A$-$104_D$) can also include, LTE-based devices, such as, but not limited to, most any home or commercial appliance that includes an LTE radio. It can be noted that UEs (e.g., $104_A$-$104_D$) can be mobile, have limited mobility and/or be stationary. In one example, UEs (e.g., $104_A$-$104_D$) can include a multi-band, multi-mode, and/or multi-radio device.

Figure 2:
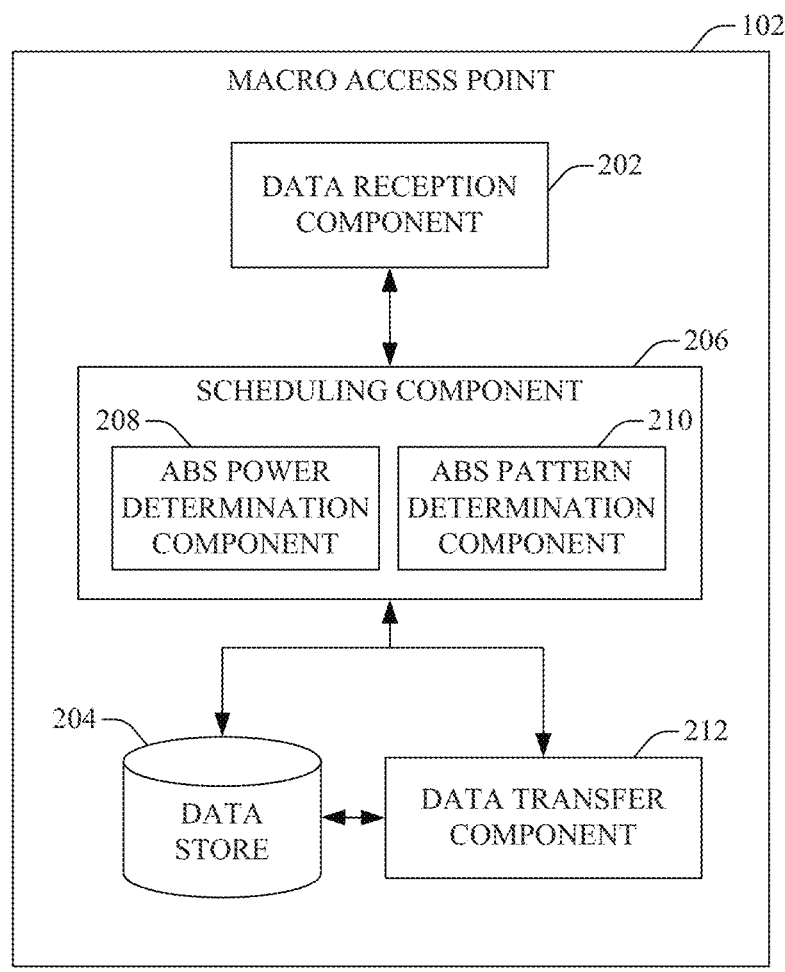
FIG. 2 illustrates an example system for scheduling adaptive reduced-power almost blank subframes (ABS).

Referring now to FIG. 2, there illustrated is an example system 200 for scheduling cell profile-based reduced-power ABS, in accordance with an aspect of the subject disclosure. In one aspect, system 200 increases a capacity of a macro access point 102 while reducing inter-cell interference in HetNets. It is noted that the macro access point 102 can be most any access point, such as but not limited to a macro access point, a base station, an eNodeB (eNB), etc. and can include functionality as more fully described herein, for example, as described above with regard to system 100.

The macro access point 102 comprises a data reception component 202 that receives cell profile data of neighbor access point(s) (e.g., metro cells $106_1$ and $106_2$). As an example, the cell profile data can include, but is not limited to, cell-type (e.g., macro, metro, femto, etc.), antenna tilt/pattern/mounting, transmission power level, MIMO configuration, carrier aggregation, indoor/outdoor location, public/private access, cell capacity, number and/or types of technologies supported by the metro access point, etc. Moreover, it can be noted that the cell-type can represent a capability(ies)/characteristic(s) of the cell and is not limited to a size-related/power-related classification. In addition to differences in size (e.g., coverage areas), macro and metro cells have different features/capabilities (e.g., indoor vs. outdoor deployment, public vs. private access, etc.). Further, cells that are classified within the same size category (e.g., small cells) can have different power levels (e.g., 1 W, 5 W, etc.) and/or features and thus, different cell-types. As an example, the type of a cell can represent the cell's capacity (e.g., number of UEs supported by the cell; a macro cell can support thousands of UEs; a metro cell can support tens to hundreds of UEs; a consumer femto cell can support 1-10 UEs). In another example, the type of a cell can represent whether the cell is part of a Closed Subscriber Group (CSG). This feature of small cells can be turned on if some enterprise customers want to limit the small cell access to their own users. Macro cells are not part of CSGs and can always be publicly accessed. Further, multi-technology cells can be identified. For example, cells that support cellular technology along with WiFi technology can be identified. Furthermore, cell profile data can include parameters such as, but not limited to, transmission power level, antenna pattern, antenna tilt, antenna mounting, antenna configuration, carrier aggregation, cell location data, etc.

In one aspect, the data reception component 202 can request and/or receive the cell profile data from the access points (e.g., neighbor access point(s)), for example, during (or subsequent to) establishment of a peer-to-peer (P2P) link (e.g., X2 interface) between the macro access point 102 and the respective access points. In another aspect, the data reception component 202 can request and/or receive the cell profile data from a network device (not shown). In yet another aspect, the data reception component 202 can determine the cell characteristic data from history information received from the UE(s) (e.g., $104_A$). Additionally or optionally, the data reception component 202 can receive from a network device performance data associated with HetNet mobility. The cell profile data and/or performance data can be stored in data store 204 (and/or most any other internal or remote data store) such that the cell profile data can be analyzed by a scheduling component 206 to configure reduced-power ABS. It is noted that the data store 204 can include volatile memory(s) or nonvolatile memory(s), or can include both volatile and nonvolatile memory(s). Examples of suitable types of volatile and non-volatile memory are described below with reference to FIG. 9. The memory (e.g., data stores, databases) of the subject systems and methods is intended to comprise, without being limited to, these and any other suitable types of memory.

The scheduling component 206 can comprise an ABS power determination component 208 and/or an ABS pattern determination component 210. According to an embodiment, the ABS power determination component 208 can analyze the cell profile data (and/or performance data) to distinguish between different neighbor metro cells and based on characteristics associated with a specific metro cell, modify a power level of data (e.g., user data) transmitted by the macro access point 102 during the ABS. Additionally or optionally, the ABS power determination component 208 can utilize monitored data, such as, but not limited to, network traffic and/or network load to adjust the power level. In one example, the ABS power determination component 208 can compute/calculate the power level based on policy data (e.g., operator-defined policies) and/or historical data, for example, stored in data store 204. In another example, the ABS power determination component 208 can look-up a power level value corresponding to the cell profile data in a table that can be stored in data store 204. The table can be populated based on operator-defined information received (e.g., by data reception component 202) from a mobility network device and/or can be populated based on historical and/or performance feedback data. Moreover, the ABS power determination component 208 can determine the reduced-power ABS power level periodically, on-demand, in response to detecting an event (e.g., change in cell profile data), at a defined time, etc.

In one aspect, the ABS power determination component 208 can adjust the power level based on transmit power of the neighbor metro cells. For example, if the metro cells located within macro cell coverage have relatively higher power, such as 5 W, then the ABS power determination component 208 can significantly scale down its transmission power during ABS to reduce interference (e.g., transmit at 20-30%); however, if the metro cells located within macro cell coverage have relatively lower power, such as 1 W, then the ABS power determination component 208 does not significantly scale down the macro cell's transmission power during ABS such that the macro access point 102 can utilize the allowed transmit power (e.g., 60-70%) for macro data transfer.

In another aspect, the ABS power determination component 208 can adjust the power level based on location data associated with the neighbor metro cells. For example, if the metro cells are deployed closer to (e.g., within a predefined distance threshold) the macro access point 102 and/or at a location with high macro radio frequency coverage (e.g., to increase macro network capacity), the ABS power determination component 208 can significantly scale down the macro cell's transmission power during ABS to reduce interference (e.g., transmit at 20-30%); however, if the metro cells are deployed at a cell edge and/or at a location with poor macro radio frequency coverage (e.g., to increase macro network coverage), the metro cell signal can easily achieve dominance and accordingly, the ABS power determination component 208 does not significantly scale down the macro cell's transmission power during ABS such that the macro access point 102 can utilize the allowed transmit power (e.g., 60-70%) for macro data transfer.

In still another aspect, the ABS power determination component 208 can adjust the power level based on small cell antenna configuration, such as directional vs. omni, MIMO, mounting location (e.g., high low), tilt, etc. associated with the neighbor metro cells. Moreover, based on the antenna configuration (and/or cell location), the ABS power determination component 208 can determine coverage areas/patterns/footprints of the metro cells and can accordingly, adjust the macro cell's transmission power during the ABS to ensure minimal (or reduced) interference in the determined coverage areas. In yet another aspect, the ABS power determination component 208 can adjust the power level based on metro cell edge user performance and/or HetNet mobility performance (e.g., real-time performance of handovers between metro cell and macro cell). As an example, if the performances are determined to satisfy a performance criterion (e.g., to be satisfactory, good, high, etc.), the ABS power determination component 208 does not significantly scale down the macro cell's transmission power during ABS such that the macro access point 102 can utilize the allowed transmit power (e.g., 60-70%) for macro data transfer; however, if the performance degrades (e.g., below a performance threshold), the ABS power determination component 208 can scale down the macro cell's transmit power during ABS, for example, till mute (0%). It is appreciated that the specification is not limited to the above noted examples, and that the ABS power determination component 208 can utilize most any cell profile data to dynamically change the ABS power level.

The ABS pattern determination component 210 can select subframes for reduced-power ABS and determine a pattern bitmap, for example, of length 40 subframes, i.e. spanning over 4 frames. Moreover, the ABS pattern determination component 210 can determine the pattern bitmap periodically, on-demand, in response to detecting an event (e.g., change in resource usage data), at a defined time, etc. and a data transfer component 212 can provide the pattern bitmap to the neighbor access point(s), for example, via an X2 interface. As an example, the data transfer component 212 can transmit the pattern bitmap as part of (or appended to) a "load indication" and/or "resource status reporting initiation" message. The ABS patterns can be configured dynamically by the network using self-optimizing networks (SON) feature to optimize the reduced-power ABS ratio (e.g., number of reduced-power ABS to a total number of subframes in a frame) according to various criteria, such as, but not limited to, real-time resource usage received from the neighbor access points, operator-defined policies received from a mobility network device, cell-edge users throughput, and/or load balancing, etc. As an example, the ABS pattern determination component 210 can initially schedule 10% of resources for reduced-power ABS; however, if resource usage data received (e.g., periodically, on-demand, at a defined time, etc.) indicates that the neighbor metro cell utilizes only 5% of the resources, then the ABS pattern determination component 210 can modify the ABS pattern bitmap to reduce the number of reduced-power ABS transmitted and schedule only 5-6% of the resources for reduced-power ABS. The scheduling component 206 can utilize the power level and pattern bitmap data determined by the ABS power determination component 208 and the ABS pattern determination component 210, respectively, to schedule and transmit data to its served UEs. Although depicted to reside within and be part of the macro access point, it can be noted that the ABS power determination component 208 and/or ABS pattern determination component 210 can reside (completely or partially) within most any network device. Based on the ABS pattern bitmap, the neighbor metro cells can transmit data packets to their cell-edge (or close to cell edge) UEs during the reduced-power ABS and serve their cell-center (or close to cell center) UEs in the rest of the subframes, such that the overall throughput of the UEs served by the neighbor metro cells is improved.

Figure 3A:
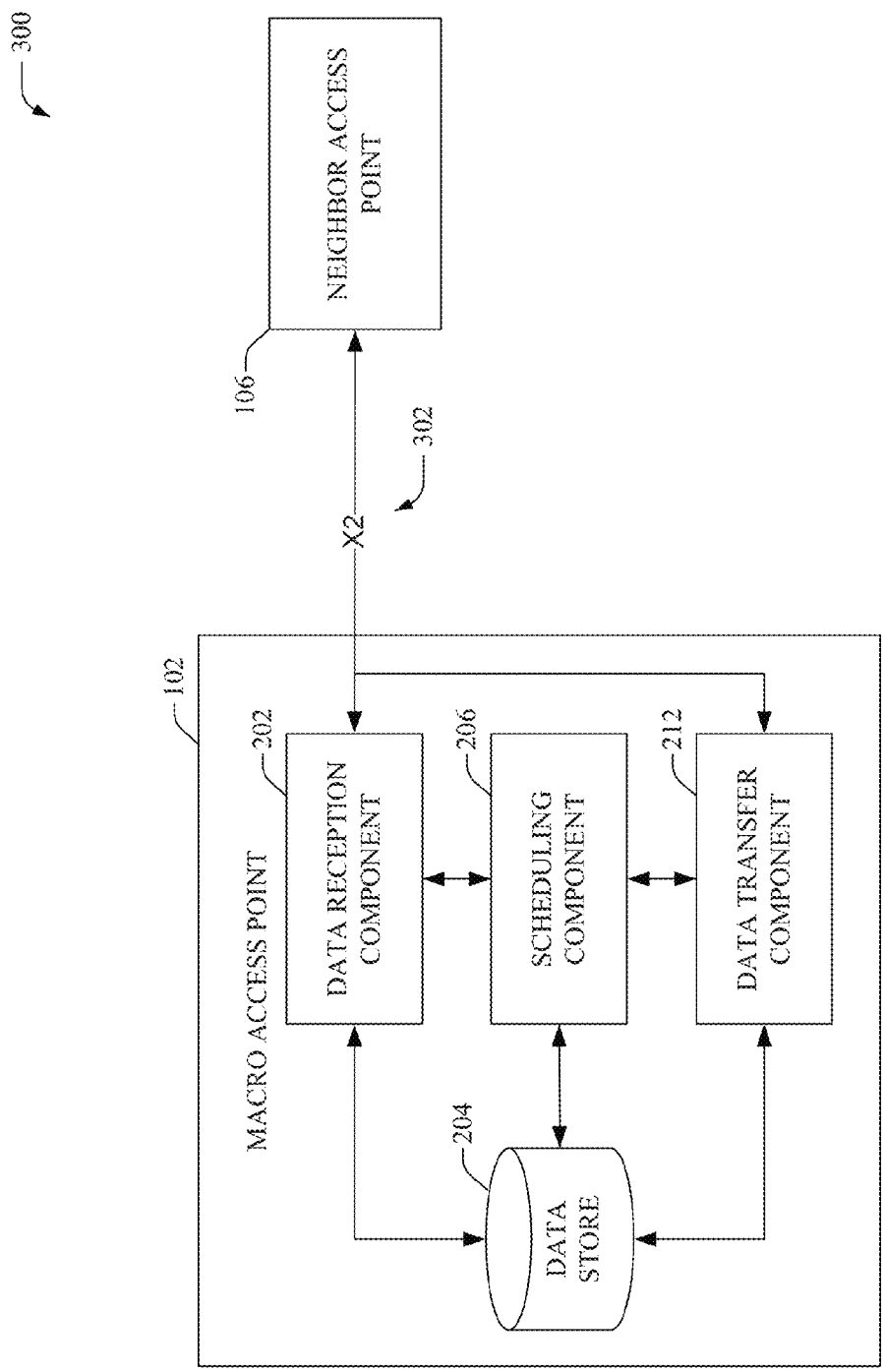
FIGS. 3A-3C illustrate example systems that facilitate a transfer of cell profile data between access points of a communication network.
Figure 3B:
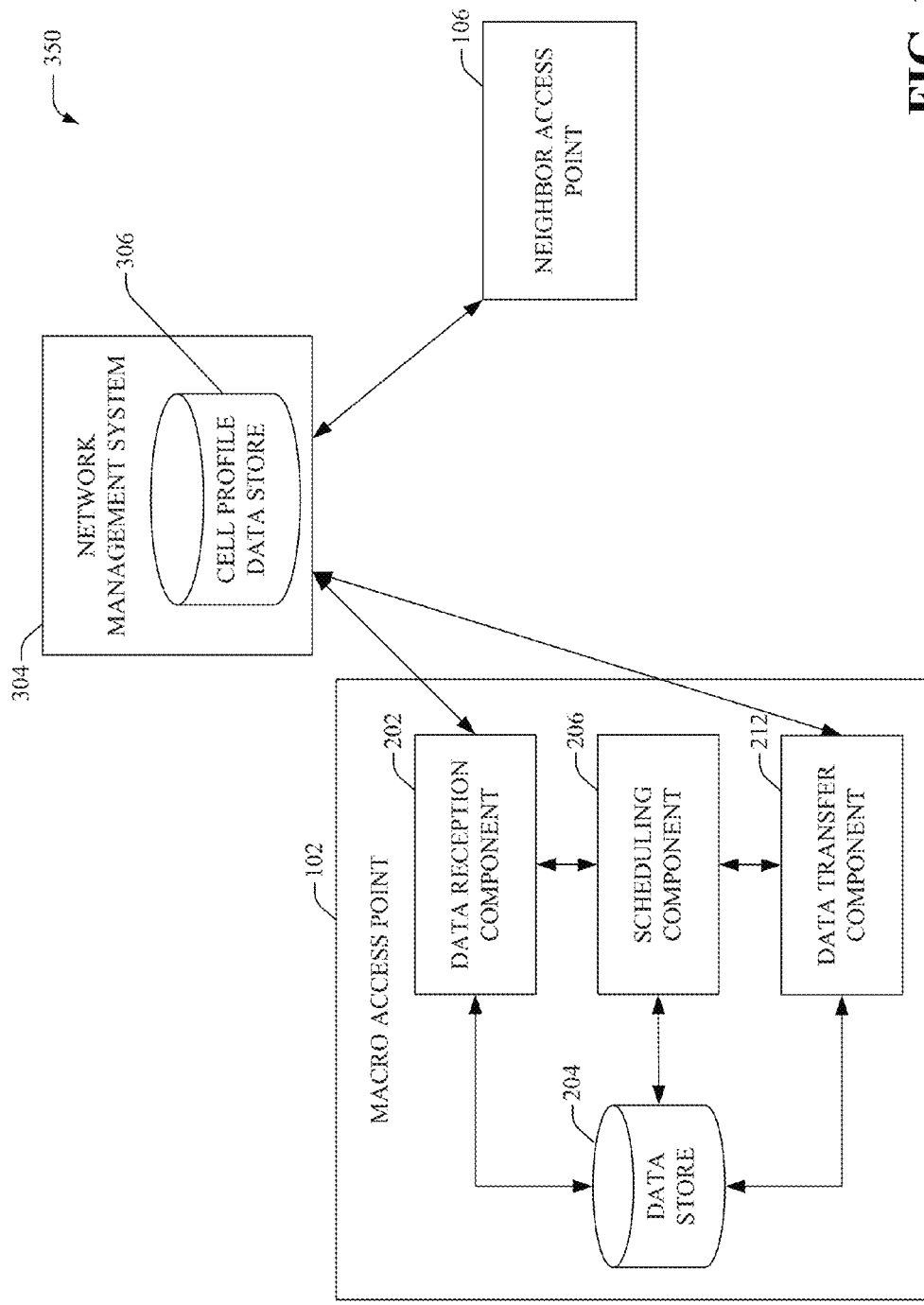
Figure 3C:
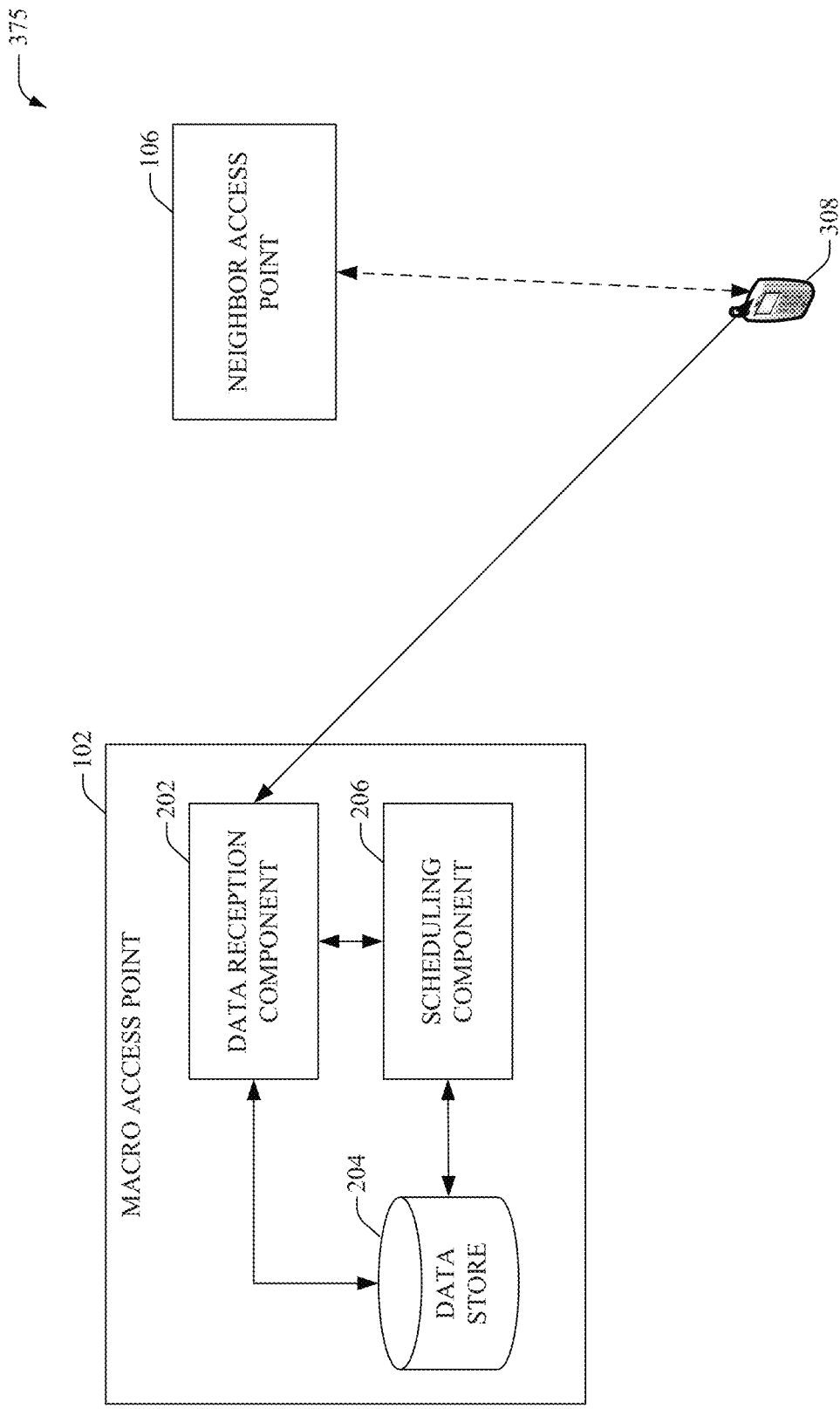

Referring now to FIGS. 3A-3C, there illustrated are example systems (300, 350, 375) that facilitate a transfer of cell profile data between access points of a communication network (e.g., cellular network, HetNet, etc.), according to an aspect of the subject disclosure. It is noted that the macro access point 102, the data reception component 202, the data store 204, the scheduling component 206, and the data transfer component 212 can include functionality as more fully described herein, for example, as described above with regard to systems 100 and 200. The neighbor access point 106 can be substantially similar to metro access points $106_1$-$106_2$ and can include functionality as more fully described herein, for example, as described above with regard to metro access points $106_1$-$106_2$. In one example, the neighbor access point 106 can include, but is not limited to an access point that is operated and/or deployed by a service provider of the communication network that operates and/or deploys the macro access point 102, and that utilizes the same or different radio technologies for communication with the UEs (e.g., UE $104_A$-$104_D$) as utilized by macro access point 102.

FIG. 3A illustrates example system 300 that depicts a transmission of cell profile data between the neighbor access point 106 and the macro access point 102 via a peer-to-peer interface. In one aspect, a control plane protocol, such as, but not limited to an access point-to-access point signaling protocol can be utilized for the transmission. For example, an X2-application protocol (AP) on the X2 interface 302 can be utilized for the transmission. It is noted that the X2 interface 302 can be a logical interface between neighbor access points and is not limited to a dedicated physical connection between access points. The X2 interface 302 can couple access points via an existing IP transport network. For lowest latency and minimum loading of the transport network, the path of the physical X2 connection can be kept as short as possible, for example, by utilizing point-to-multipoint backhaul links. However, it is to be noted that the backhaul link can have most any configuration (e.g., point-to-point).

In an aspect, the cell profile data of the neighbor access point 106 can be transmitted to the macro access point 102. As an example, the data reception component 202 can facilitate an exchange of cell profile data during a set-up or initialization of the X2 interface 302 between the macro access point 102 and the neighbor access point 106. Additionally or alternatively, the data reception component 202 can facilitate the exchange of cell profile data after the X2 interface 302 between the macro access point 102 and the neighbor access point 106 has been set up. It can be noted that the cell profile data can be transmitted at most any time, such as, but not limited to, periodically, on-demand, in response to an event (e.g., change in cell profile data, addition of the access point to the network, etc.), at a predefined time, etc. In one embodiment, the cell profile data can be included within or appended to an X2 Setup request message and/or X2 Setup response message that are exchanged during initialization of the X2 interface 302. Alternatively, the cell profile data can be transmitted as a new/separate message.

As discussed supra, the cell profile data can comprise cell-type data that represents capabilities of an access point/cell. For example, the cell-type data can specify whether the cell is a macro cell, metro cell, femtocell, pico cell, etc. Additionally, the cell profile data can provide characteristic information regarding the neighbor access point 106, such as, but not limited to, antenna tilt/pattern, power level, MIMO, carrier aggregation, indoor/outdoor location, public/private access, capacity, etc. This information can be utilized (e.g., by the scheduling component 206) to determine a customized power level for reduced-power ABS and/or the ABS pattern bitmap. In one aspect, the data transfer component 212 can transmit the ABS pattern bitmap to the neighbor access point 106 via the X2 interface 302, for example, periodically, on-demand, in response to an event (e.g., change in the pattern), at a predefined time, etc. In one aspect, the ABS pattern bitmap can be included within or appended to a "Load Indication" message and/or "Resource Status Reporting Initiation" message that can be exchanged via the X2 interface 302. In another aspect, the ABS pattern bitmap can be included within or appended to "Invoke Indication" messages that allow the neighbor access point 106 to request for ABS configuration from the macro access point 102. The request initiates a load indication procedure that results in the "Load Indication" message with the ABS pattern bitmap being transmitted to the neighbor access point 106. Alternatively, the cell profile data can be transmitted as a new/separate message(s).

Referring now to FIG. 3B, there illustrated is an example system 350 that facilitates transmission of cell profile data via a network management device, according to one or more aspects of the disclosed subject matter. In one aspect, a network management system 304 of the communication network can receive (e.g., via a push or pull configuration) cell profile data associated with the macro access point 102 and/or the neighbor access point 106. It can be noted that the network management system 304 can be locally coupled to the macro access point 102 and/or the neighbor access point 106, for example, located within the radio access network (RAN) (e.g., be part of the self optimizing network (SON)) or can be located elsewhere within the communication network (e.g., core mobility network). Moreover, the network management system 304 can store data received from one or more access points, including the neighbor access point 106, in a cell profile data store 306. This stored data can be accessed by the macro access point 102, for example, if the macro access point 102 does not directly receive the cell profile data from the neighbor access point 106.

According to an aspect, the data reception component 202 can initiate a query for the cell profile data. As an example, the query can be transmitted periodically (e.g., based on predefined timing intervals), on-demand, in response to an event, etc. In response to receiving the query, the network management system 304 can identify access points that are neighboring the macro access point 102 (including neighbor access point 106), lookup cell profile data received from the neighboring access points in the cell profile data store 306, and transmit the data to the macro access point 102. In an aspect, the query generated by the data reception component 202 can include data such as (but not limited to) the served physical cell ID (PCI) of the macro access point 102, the cell identifier (ID) associated with the macro access point 102, the Basic Service Set IDentifier (BSSID) and/or the Service Set Identifier (SSID). Based on the PCI/SSID/BSSID, the network management system 304 can identify the network sectors corresponding to the macro access point 102 and/or the one or more neighboring access points (e.g., neighbor access point 106), dynamically determine (and/or lookup) the corresponding cell profile data, and transmit the determined data to the macro access point 102. The macro access point 102 can receive the cell profile data (e.g., via the data reception component 202), store the cell profile data (e.g., via the data store 204) and analyze the cell profile data to facilitate scheduling of adaptive reduced-power ABS (e.g., via the scheduling component 206).

In one aspect, the data transfer component 212 can transmit the ABS pattern bitmap to the network management system 304 that can store the ABS pattern bitmap, for example, in the cell profile data store 306. The stored ABS pattern bitmap can be accessed by the neighbor access point 106 (via a push or pull configuration at most any time, for example, periodically, on-demand, in response to an event (e.g., change in the pattern), at a predefined time, etc.

Referring now to FIG. 3C, there illustrated is an example system 375 that facilitates transmission of cell profile data via a UE 308, according to one or more aspects of the disclosed subject matter. UE 308 can be substantially similar to UEs 104$_A$-104$_D$ and can include functionality as more fully described herein, for example, as described above with regard to UEs 104$_A$-104$_D$. In one aspect, data reception component 202 can receive (e.g., via a push or pull configuration) enhanced UE history information from UE 308. The enhanced UE history information can be received during registration/attachment of the UE 308 with the macro access point 102, periodically (e.g., based on predefined timing intervals), on-demand, in response to an event, etc. As an example, the enhanced UE history information can comprise information about cells (e.g., including a neighboring cell associated with neighbor access point 106) that the UE 308 has been served by in an active state, prior to the UE 308 attaching/registering with the macro access point 102. In one aspect, the cell profile data can be included within and/or be appended to the enhanced UE history information. For example, cell profile data can provide information regarding the access point/cell, such as, but not limited to, cell-type, antenna tilt/pattern, power level, MIMO, carrier aggregation, indoor/outdoor location, public/private access, capacity, etc.

In an aspect, the data reception component 202 can parse the UE history information to extract the cell profile data. The extracted information can be stored in the data store 204. This stored data can be accessed by the scheduling component 206, for example, to schedule adaptive reduced-power ABS.

Figure 4:
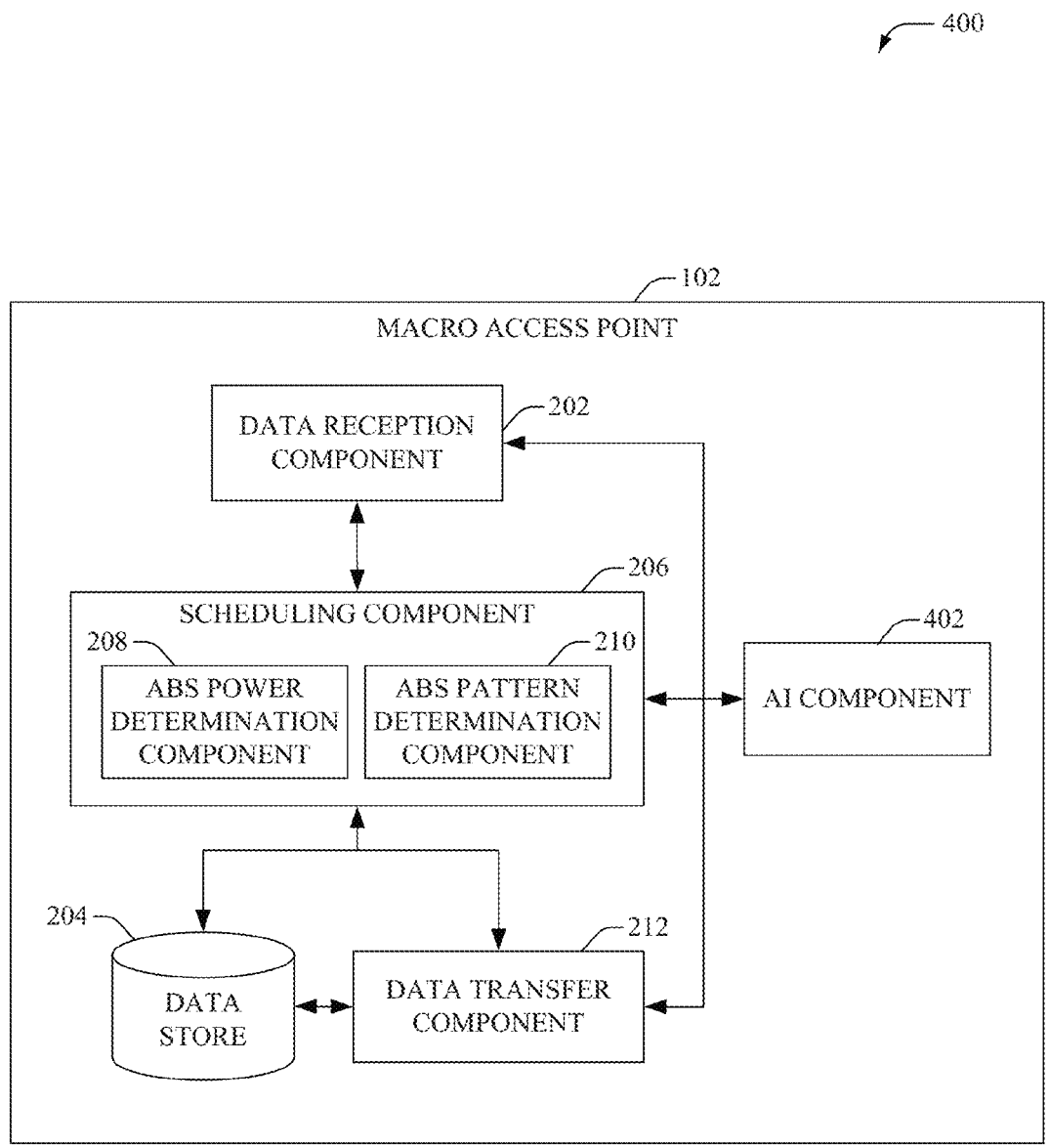
FIG. 4 illustrates an example system that facilitates automating one or more features in accordance with the subject embodiments.

Referring now to FIG. 4, there illustrated is an example system 400 that employs one or more artificial intelligence (AI) components (402), which facilitate automating one or more features in accordance with the subject embodiments. It can be appreciated that the macro access point 102, the data reception component 202, the data store 204, the scheduling component 206, the ABS power determination component 208, the ABS pattern determination component 210, and the data transfer component 212 can include respective functionality, as more fully described herein, for example, with regard to systems 100-300, 350 and 375.

In an example embodiment, system 400 (e.g., in connection with automatically determining and/or transmitting ABS reduced power levels etc.) can employ various AI-based schemes for carrying out various aspects thereof. For example, a process for determining an optimal time/schedule to receive/update cell profile data, an optimal time/schedule to transfer the ABS pattern, an optimal power level for the reduced-power ABS, the reduced-power ABS ratio, etc. can be facilitated via an automatic classifier system implemented by AI component 402. A classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. In the case of communication systems, for example, attributes can be information received from UEs and/or access points, and the classes can be categories or areas of interest (e.g., levels of priorities). A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

As will be readily appreciated from the subject specification, an example embodiment can employ classifiers that are explicitly trained (e.g., via a generic training data) as well as implicitly trained (e.g., via observing access point/UE behavior, user/operator preferences or policies, historical information, receiving extrinsic data, type of access points, mobility performance data, etc.). For example, SVMs can be configured via a learning or training phase within a classifier constructor and feature selection module. Thus, the classifier(s) of AI component 402 can be used to automatically learn and perform a number of functions, including but not limited to determining according to a predetermined criteria when and/or from which access points is the cell profile data to be received, a schedule according to which the cell profile data is to be received/updated, a schedule according to which the ABS pattern bitmaps are to be transferred to neighbor access points, a power level for the reduced-power ABS, the reduced-power ABS ratio to modify the ABS pattern bitmap, etc. The criteria can include, but is not limited to, historical patterns and/or trends, user preferences, service provider preferences and/or policies, location of the access points, current time/day, access preferences (e.g., public or private) of the macro access point 102 and/or neighbor access points, network load/traffic, real-time performance/usage data, and the like.

Figure 5:
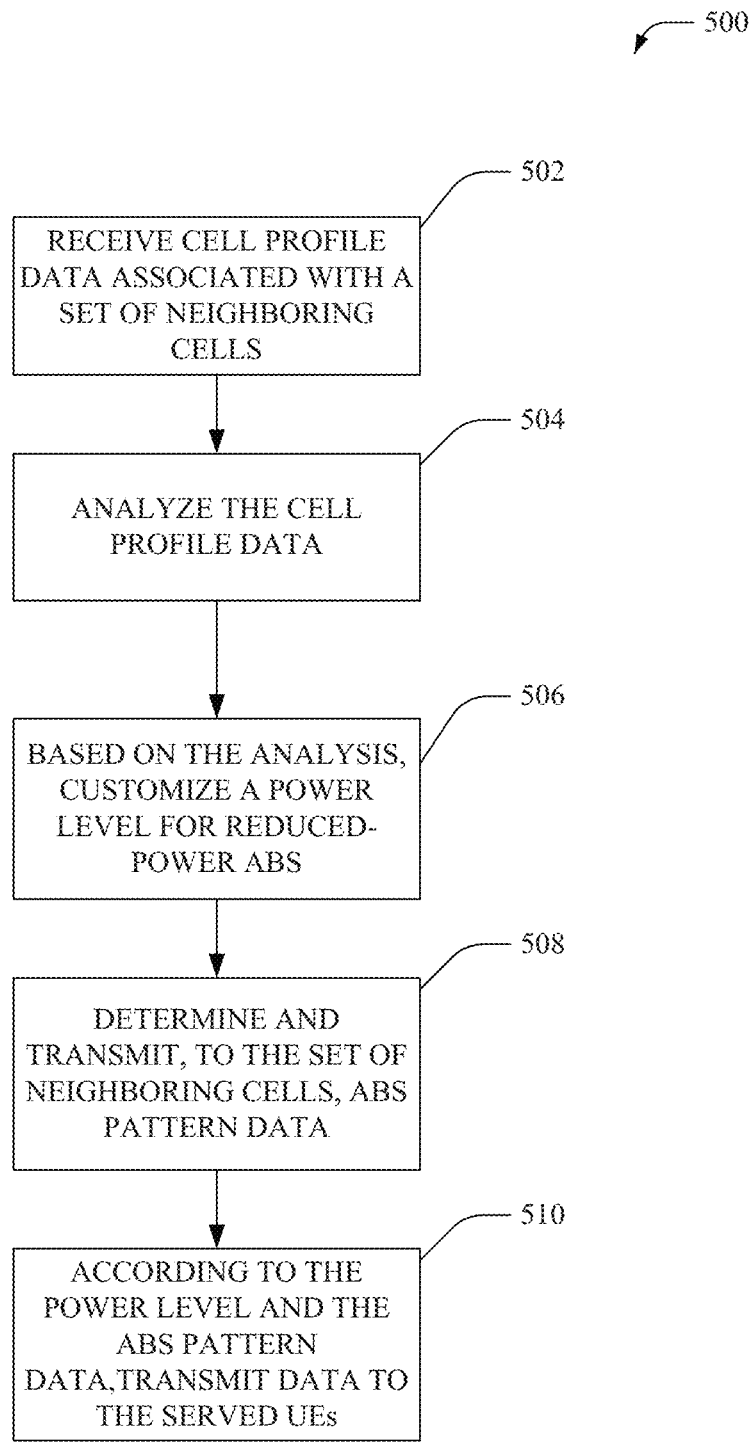
FIG. 5 illustrates an example method that facilitates scheduling adaptive reduced-power ABS.

FIG. 5 illustrates a flow diagram and/or method in accordance with the disclosed subject matter. For simplicity of explanation, the flow diagrams and/or methods are depicted and described as a series of acts. It is to be understood and appreciated that the various embodiments are not limited by the acts illustrated and/or by the order of acts, for example acts can occur in various orders and/or concurrently, and with other acts not presented and described herein. Furthermore, not all illustrated acts may be required to implement the flow diagrams and/or methods in accordance with the disclosed subject matter. In addition, those skilled in the art will understand and appreciate that the methods could alternatively be represented as a series of interrelated states via a state diagram or events. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or computer-readable storage/communications media.

Referring now to FIG. 5, illustrated is an example method 500 that facilitates scheduling adaptive reduced-power ABS, according to an aspect of the subject disclosure. As an example, method 500 can be implemented by one or more network devices of a RAN, for example, a macro access point (e.g., base station, eNB, HNB, HeNB, etc.) In another example, method 500 can be implemented (at least partially) by one or more devices of a core mobility network.

At 502, cell profile data associated with a set of neighboring cells, such as, but not limited to a cell-type data (e.g., that represents capabilities/features/characteristics of a cell), antenna configuration (e.g., tilt/pattern/mounting), power level, MIMO, carrier aggregation, indoor/outdoor location, geographical location, public/privately owned, cell capacity, etc., can be received, for example, by a macro cell. In one example, the data can be received via an X2 interface (e.g., as part of a setup message and/or subsequent to the setup of the X2 interface). In another example, the data can be received via one or more network devices, for example, within the RAN and/or core mobility network. In yet another example, the data can be extracted from enhanced UE history data received from one or more UEs that are coupled to the macro access point. At 504, the cell profile data can be analyzed and at 506, a power level for reduced-power ABS can be customized based on the analysis. As an example, a power level with which data can be transmitted to UEs served by the macro access point during ABS can be computed/calculated based on policy data (e.g., operator-defined policies) and/or historical data. In another example, the power level can be determined based on looking-up a power level value corresponding to the cell profile data in a table.

At 508, ABS pattern data can be determined and transmitted to the set of neighboring cells. The ABS pattern comprises bitmap indicating which of the subframes are designated as reduced-power ABS. As an example, the ABS pattern data can be transmitted to the neighboring cells via an X2 interface, for example, via a "load indication" and/or "resource status reporting initiation" message. The reduced-power ABS ratio (e.g., number of reduced-power ABS to total number of subframes) can be modified according to various criteria, such as, but not limited to, real-time resource usage received from the neighbor access points, operator-defined policies received from a mobility network device, cell-edge users throughput, and/or load balancing, etc. Based on the ABS pattern bitmap, the neighboring cells transmit data packets to UEs at (or close to) their cell-edge during the reduced-power ABS to reduce interference and increase throughput of the UEs. At 510, the power level and ABS pattern data can be utilized to transmit data to the served UEs.

Figure 6:
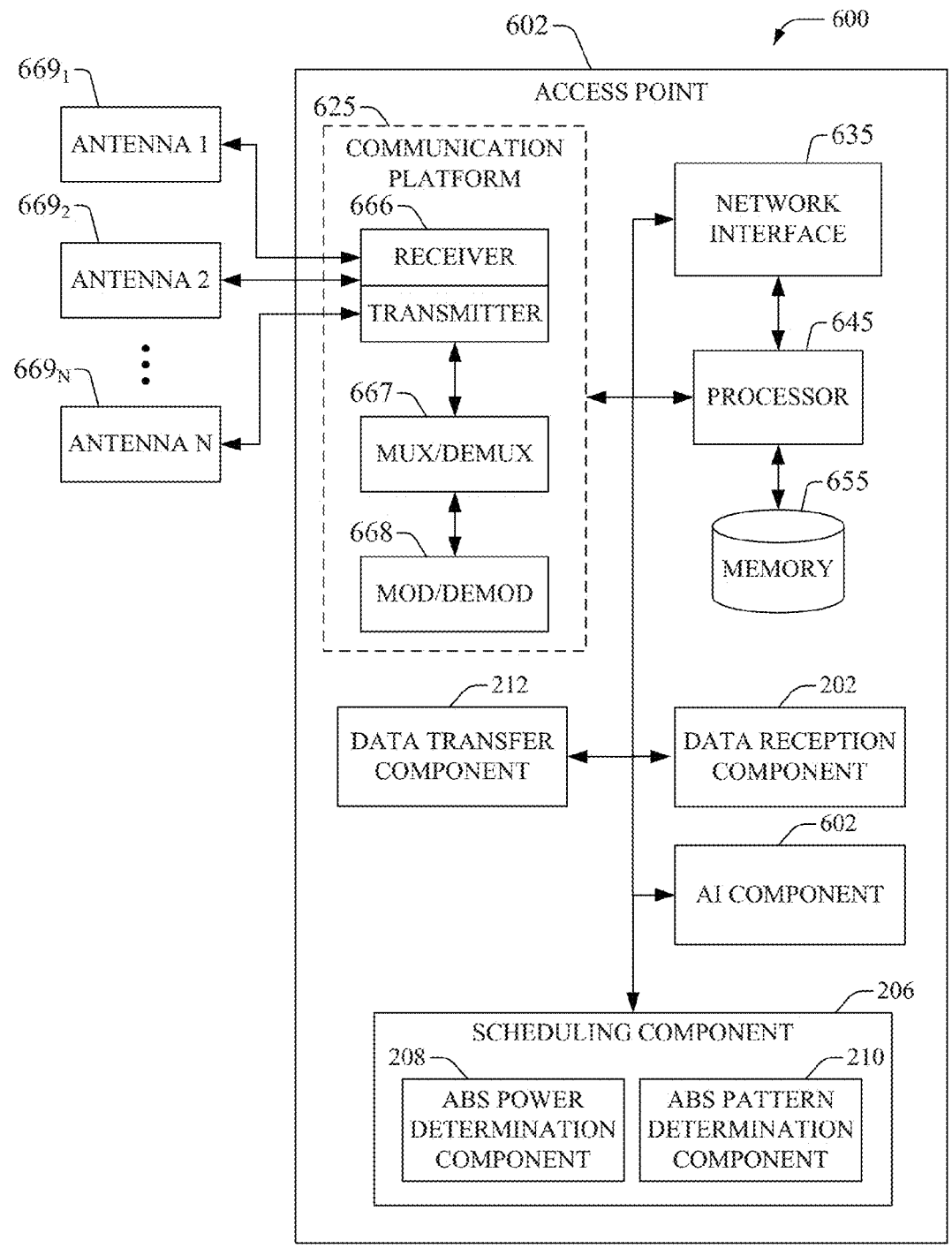
FIG. 6 illustrates an example block diagram of an access point suitable for scheduling cell profile-based reduced-power ABS.
Figure 7:
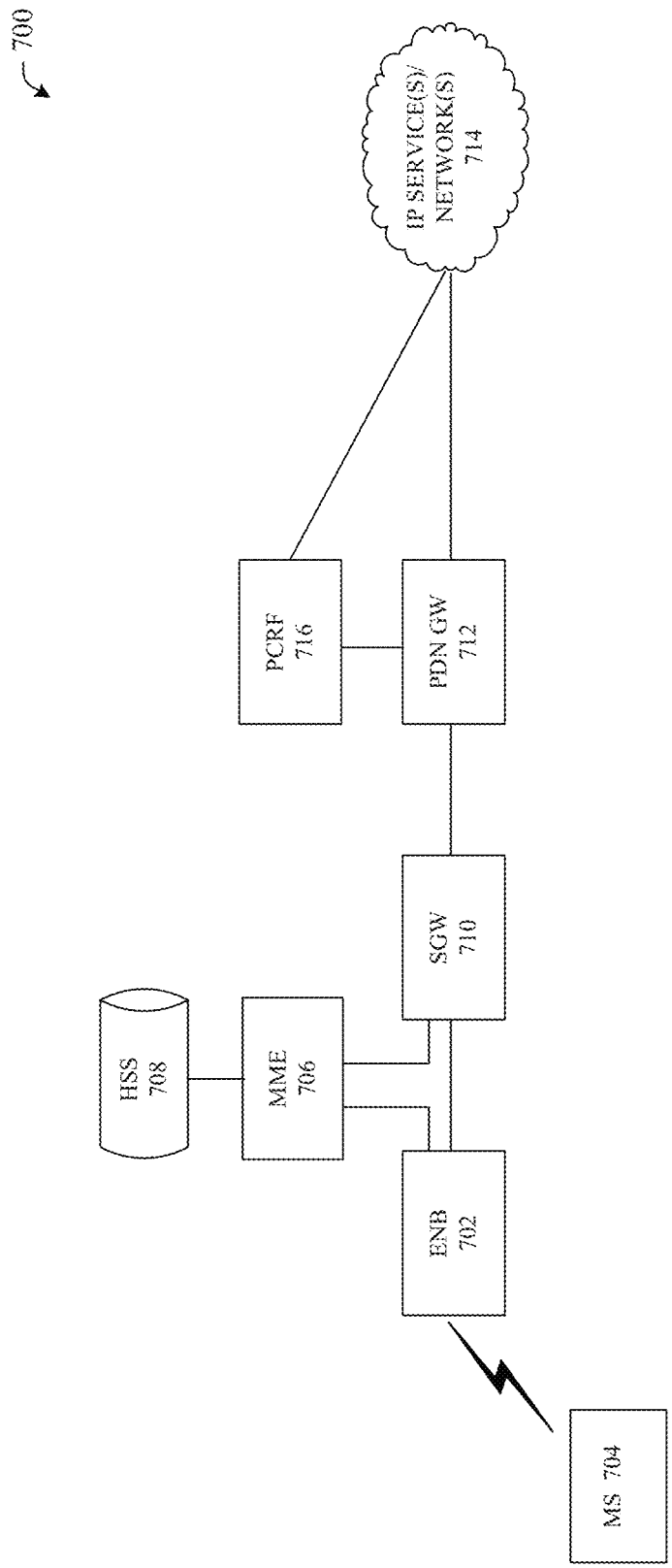
FIG. 7 illustrates a Long Term Evolution (LTE) network architecture that can employ the disclosed architecture

To provide further context for various aspects of the subject specification, FIGS. 6 and 7 illustrate, respectively, a block diagram of an example embodiment 600 of an access point that facilitates adaptive reduced-power ABS based on cell profile data and a wireless communication environment 700, with associated components for operation of efficient cell reselection in accordance with aspects described herein.

With respect to FIG. 6, in example embodiment 600 comprises an access point 602. As an example, the macro access point 102 (and/or the neighbor access points $106_1$ and $106_2$) disclosed herein with respect to systems 100-400 can each include at least a portion of the access point 602. In one aspect, the access point 602 can receive and transmit signal(s) (e.g., traffic and control signals) from and to wireless devices, access terminals, wireless ports and routers, etc., through a set of antennas $669_1$-$669_N$, for example, based on the ABS pattern and customized power level for reduced-power ABS. It should be appreciated that while antennas $669_1$-$669_N$ are a part of communication platform 625, which comprises electronic components and associated circuitry that provides for processing and manipulating of received signal(s) (e.g., a packet flow) and signal(s) (e.g., a broadcast control channel) to be transmitted. In an aspect, communication platform 625 can include a transmitter/receiver (e.g., a transceiver) 666 that can convert signal(s) from analog format to digital format (e.g., analog-to-digital conversion) upon reception, and from digital format to analog (e.g., digital-to-analog conversion) format upon transmission. In addition, receiver/transmitter 666 can divide a single data stream into multiple, parallel data streams, or perform the reciprocal operation. Coupled to transceiver 666 is a multiplexer/demultiplexer 667 that facilitates manipulation of signal in time and/or frequency space. Electronic component 667 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM), etc. In addition, mux/demux component 667 can scramble and spread information (e.g., codes) according to substantially any code known in the art; e.g., Hadamard-Walsh codes, Baker codes, Kasami codes, polyphase codes, and so on. A modulator/demodulator 668 is also a part of operational group 625, and can modulate information according to multiple modulation techniques, such as frequency modulation, amplitude modulation (e.g., M-ary quadrature amplitude modulation (QAM), with M a positive integer), phase-shift keying (PSK), and the like.

Access point 602 also includes a processor 645 configured to confer functionality, at least partially, to substantially any electronic component in the access point 602, in accordance with aspects of the subject disclosure. In particular, processor 645 can facilitate implementing configuration instructions received through communication platform 625, which can include storing data in memory 655. In addition, processor 645 can facilitate processing data (e.g., symbols, bits, or chips, etc.) for multiplexing/demultiplexing, such as effecting direct and inverse fast Fourier transforms, selection of modulation rates, selection of data packet formats, inter-packet times, etc. Moreover, processor 645 can manipulate antennas $669_1$-$669_N$ to facilitate beamforming or selective radiation pattern formation, which can benefit specific locations covered by the access point 602; and exploit substantially any other advantages associated with smart-antenna technology. Memory 655 can store data structures, code instructions, system or device information like device identification codes (e.g., International Mobile Station Equipment Identity (IMEI), Mobile Station International Subscriber Directory Number (MSISDN), serial number . . . ) and specification such as multimode capabilities; code sequences for scrambling; spreading and pilot transmission, floor plan configuration, access point deployment and frequency plans; and so on. Moreover, memory 655 can store configuration information such as schedules and policies; geographical indicator(s); cell profile data (e.g., of access point 602 and/or neighboring access points), ABS pattern data, ABS power levels, historical logs, and so forth. In one example, data store 204 can be implemented in memory 655.

In embodiment 600, processor 645 can be coupled to the memory 655 in order to store and retrieve information necessary to operate and/or confer functionality to communication platform 625, network interface 635 (e.g., that coupled the access point to core network devices such as but not limited to a network controller), and other operational components (e.g., multimode chipset(s), power supply sources . . . ; not shown) that support the access point 602. The access point 602 can further include a data reception component 202, a scheduling component 206, an ABS power determination component 208, an ABS pattern determination component 210, a data transfer component 212, and/or an AI component 402 which can include functionality, as more fully described herein, for example, with regard to systems 100-400. In addition, it is to be noted that the various aspects disclosed in the subject specification can also be implemented through (i) program modules stored in a computer-readable storage medium or memory (e.g., memory 655) and executed by a processor (e.g., processor 645), or (ii) other combination(s) of hardware and software, or hardware and firmware.

FIG. 7 illustrates a high-level block diagram that depicts an example LTE network architecture 700 that can employ the disclosed communication architecture. The evolved RAN for LTE consists of an eNodeB (eNB) 702 that can facilitate connection of MS 704 to an evolved packet core (EPC) network. In one aspect, the MS 704 is physical equipment or Mobile Equipment (ME), such as a mobile phone or a laptop computer that is used by mobile subscribers, with a Subscriber identity Module (SIM). The SIM includes an International Mobile Subscriber Identity (IMSI) and/or MSISDN, which is a unique identifier of a subscriber. The MS 704 includes an embedded client that receives and processes messages received by the MS 704. As an example, the embedded client can be implemented in JAVA. It is noted that MS 704 can be substantially similar to UEs $104_A$-$104_D$ and/or 308, and can include functionality described with respect to $104_A$-$104_D$ and/or 308 in systems 100 and 375. Further, eNB 702 can be substantially similar to access points 102 and/or $106_1$-$106_2$, and can include functionality described with respect to access points 102 and/or $106_1$-$106_2$ in systems 100-200 and 500.

The connection of the MS 704 to the evolved packet core (EPC) network is subsequent to an authentication, for example, a SIM-based authentication between the MS 704 and the evolved packet core (EPC) network. In one aspect, the MME 706 provides authentication of the MS 704 by interacting with the HSS 708. The HSS 708 contains a subscriber profile and keeps track of which core network node is currently handling the subscriber. It also supports subscriber authentication and authorization functions (AAA). In networks with more than one HSS 708, a subscriber location function provides information on the HSS 708 that contains the profile of a given subscriber.

As an example, the eNB 702 can host a PHYsical (PHY), Medium Access Control (MAC), Radio Link Control (RLC), and Packet Data Control Protocol (PDCP) layers that include the functionality of user-plane header-compression and encryption. In addition, the eNB 702 can implement at least in part Radio Resource Control (RRC) functionality (e.g., radio resource management, admission control, scheduling, cell information broadcast, etc.). The eNB 702 can be coupled to a serving gateway (SGW) 710 that facilitates routing of user data packets and serves as a local mobility anchor for data bearers when the MS 704 moves between eNBs. In addition, the SGW 710 can act as an anchor for mobility between LTE and other 3GPP technologies (GPRS, UMTS, etc.). When MS 704 is in an idle state, the SGW 710 terminates a downlink (DL) data path and triggers paging when DL data arrives for the MS 704. Further, the SGW 710 can perform various administrative functions in the visited network such as collecting information for charging and lawful interception.

In one aspect, the SGW 710 can be coupled to a Packet Data Network Gateway (PDN GW) 712 that provides connectivity between the MS 704 and external packet data networks such as IP service(s)/network(s) 714. Moreover, the PDN GW 712 is a point of exit and entry of traffic for the MS 704. It is noted that the MS 704 can have simultaneous connectivity with more than one PDN GW (not shown) for accessing multiple PDNs.

The PDN GW 712 performs IP address allocation for the MS 704, as well as QoS enforcement and implements flow-based charging according to rules from a Policy Control and Charging Rules Function (PCRF) 716. The PCRF 716 can facilitate policy control decision-making and control flow-based charging functionalities in a Policy Control Enforcement Function (PCEF), which resides in the PDN GW 712. The PCRF 716 can store data (e.g., QoS class identifier and/or bit rates) that facilitates QoS authorization of data flows within the PCEF. In one aspect, the PDN GW 712 can facilitate filtering of downlink user IP packets into the different QoS-based bearers and perform policy enforcement, packet filtering for each user, charging support, lawful interception and packet screening. Further, the PDN GW acts as the anchor for mobility between 3GPP and non-3GPP technologies such as WiMAX and 3GPP2 (CDMA 1X and EvDO). Although an LTE network architecture 700 is described and illustrated herein, it is noted that most any communication network architecture can be utilized to implement the disclosed embodiments.

Figure 8:
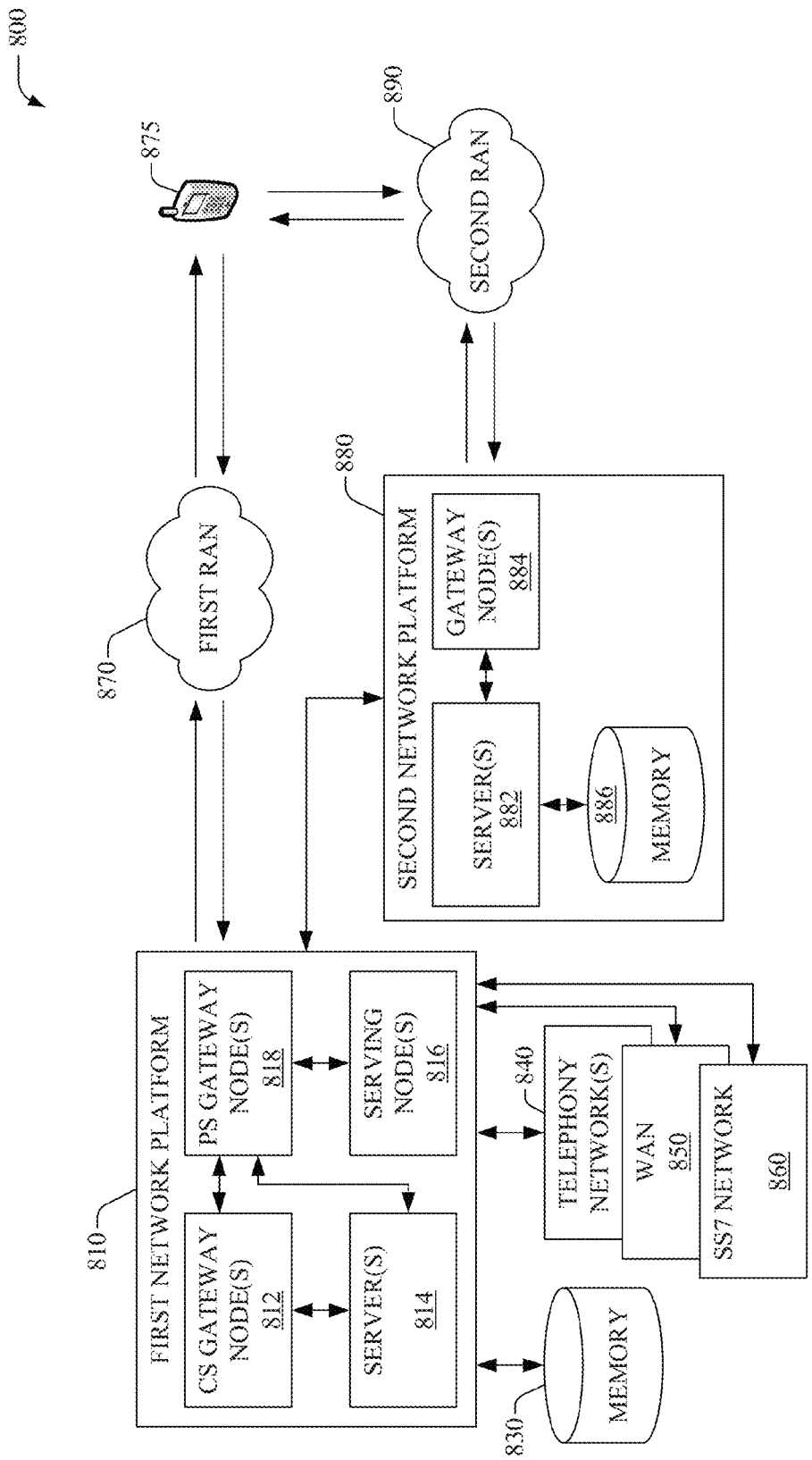
FIG. 8 illustrates an example wireless communication environment for cell reselection based on categorized cell reselection parameters.

Referring now to FIG. 8, there illustrated is a wireless communication environment 800 that includes two wireless network platforms: (i) A first network platform 810 (e.g., macro network platform) that serves, or facilitates communication with user equipment 875 via a first RAN 870. As an example, in cellular wireless technologies (e.g., 3GPP UMTS, HSPA, 3GPP LTE, 3GPP UMB, 4G LTE, etc.), the first network platform 810 can be embodied in a Core Network; and (ii) A second network platform 880 (e.g., metro network platform, wireless local area network (WLAN) platform, etc.), which can provide communication with UE 875 through a second RAN 890 linked to the second network platform 880. It should be noted that the second network platform 880 can offload UE 875 from the first network platform 810, once UE 875 attaches (e.g., based on the per category reselection parameters described herein) to the second RAN. In one example, the first RAN and the second RAN can be commonly operated and/or deployed by a common service provider. Further, it can be noted that in one example (not shown) the second RAN 890 can be directly coupled to the first network platform 810.

It is noted that RAN (870 and/or 890) includes base station(s), or access point(s), and its associated electronic circuitry and deployment site(s), in addition to a wireless radio link operated in accordance with the base station(s). Accordingly, the first RAN 870 can comprise various access points like macro access point 102, while the second RAN 890 can comprise multiple access points like neighbor metro access points $106_1$ and $106_2$. Moreover, the UE 875 can be substantially similar to and include functionality associated with UEs $104_A$-$104_D$, UE 308, and/or MS 704 described herein.

Both the first and the second network platforms 810 and 880 can include components, e.g., nodes, gateways, interfaces, servers, or platforms, that facilitate packet-switched (PS) and/or circuit-switched (CS) traffic (e.g., voice and data) and control generation for networked wireless communication. For example, the first network platform 810 includes CS gateway node(s) 812 which can interface CS traffic received from legacy networks like telephony network(s) 840 (e.g., public switched telephone network (PSTN), or public land mobile network (PLMN)) or a SS7 network 860. Moreover, CS gateway node(s) 812 interfaces CS-based traffic and signaling and gateway node(s) 818. In addition to receiving and processing CS-switched traffic and signaling, gateway node(s) 818 can authorize and authenticate PS-based data sessions with served (e.g., through the first RAN 870) wireless devices. Data sessions can include traffic exchange with networks external to the first network platform 810, like wide area network(s) (WANs) 850; it should be appreciated that local area network(s) (LANs) can also be interfaced with first network platform 810 through gateway node(s) 818. Gateway node(s) 818 generates packet data contexts when a data session is established. It should be further appreciated that the packetized communication can include multiple flows that can be generated through server(s) 814. The first network platform 810 also includes serving node(s) 816 that conveys the various packetized flows of information or data streams, received through gateway node(s) 818. It is to be noted that server(s) 814 can include one or more processors configured to confer at least in part the functionality of first network platform 810. To that end, one or more processors can execute code instructions stored in memory 830 or other computer-readable medium, for example.

In example wireless environment 800, memory 830 can store information related to operation of first network platform 810. Information can include business data associated with subscribers; market plans and strategies, e.g., promotional campaigns, business partnerships; operational data for mobile devices served through first network platform; service and privacy policies; end-user service logs for law enforcement; and so forth. Memory 830 can also store information from at least one of telephony network(s) 840, WAN(s) 850, or SS7 network 860. Many different types of information can be stored in memory 830 without departing from example embodiments.

Gateway node(s) 884 can have substantially the same functionality as PS gateway node(s) 818. Additionally or optionally, the gateway node(s) 884 can also include substantially all functionality of serving node(s) 816. In an aspect, the gateway node(s) 884 can facilitate handover resolution, e.g., assessment and execution. Server(s) 882 have substantially the same functionality as described in connection with server(s) 814 and can include one or more processors configured to confer at least in part the functionality of the first network platform 810. In one example, the network management system 304 can be implemented or executed by server(s) 882 and/or server(s) 814. To that end, the one or more processor can execute code instructions stored in memory 886, for example.

Memory 886 can include information relevant to operation of the various components of the second network platform 880. For example operational information that can be stored in memory 886 can comprise, but is not limited to, subscriber information; contracted services; maintenance and service records; cell configuration (e.g., devices served through second RAN 890; access control lists, or white lists); service policies and specifications; privacy policies; add-on features; and so forth.

Figure 9:
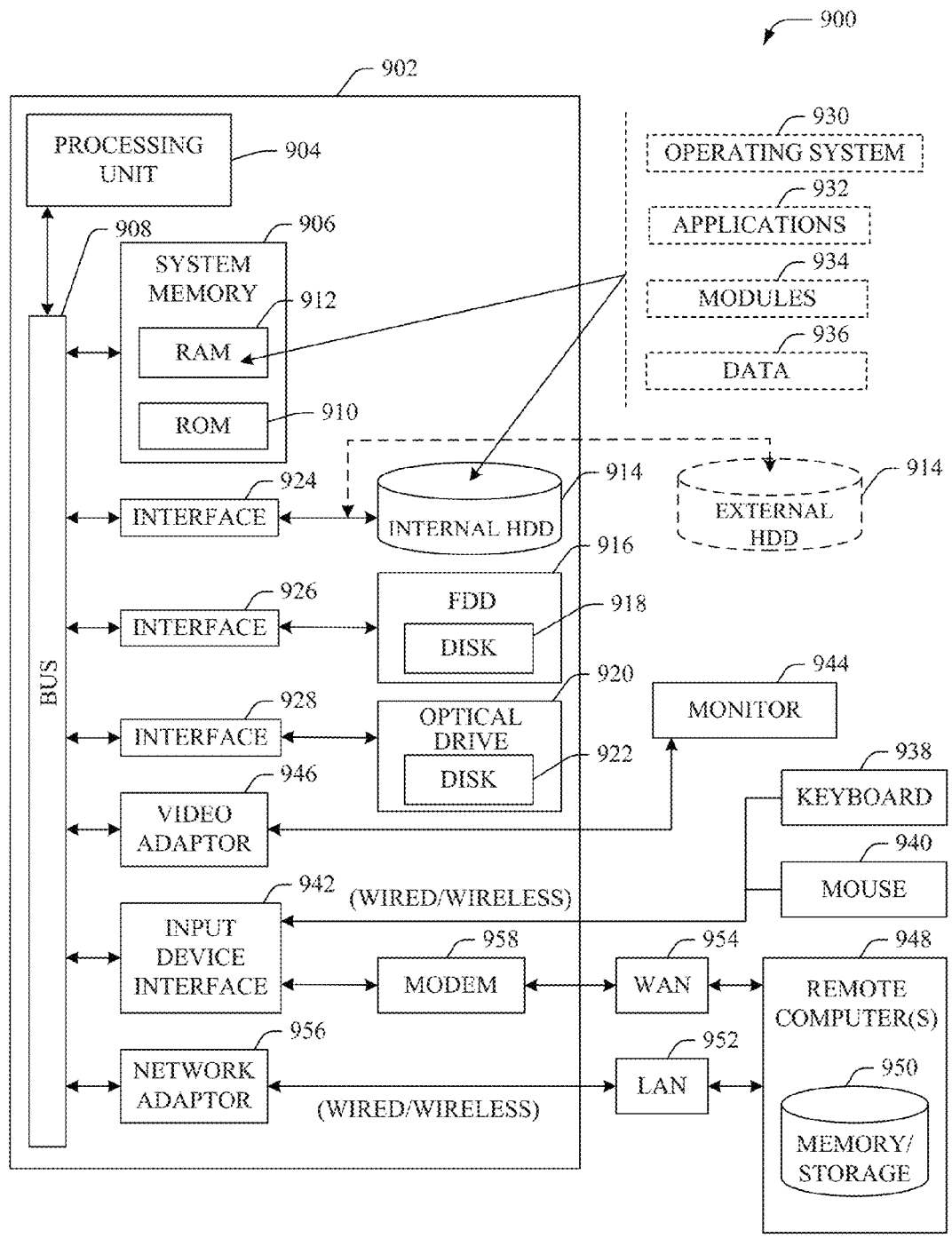
FIG. 9 illustrates a block diagram of a computer operable to execute the disclosed communication architecture.

Referring now to FIG. 9, there is illustrated a block diagram of a computer 902 operable to execute the disclosed communication architecture. In order to provide additional context for various aspects of the disclosed subject matter, FIG. 9 and the following discussion are intended to provide a brief, general description of a suitable computing environment 900 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, radio frequency (RF), infrared and other wireless media.

With reference again to FIG. 9, the example environment 900 for implementing various aspects of the specification includes a computer 902, the computer 902 including a processing unit 904, a system memory 906 and a system bus 908. As an example, the component(s), server(s), equipment, system(s), and/or device(s) (e.g., macro access point 102, metro access point $106_1$-$106_2$ and 106, UEs $104_A$-$104_D$, data reception component 202, scheduling component 206, ABS power determination component 208, ABS pattern determination component 210, data transfer component 212, network management system 304, UE 308, AI component 402, MS 704, access point 602, eNB 702, MME 706, SGW 710, PDN GW 712, PCRF 716, UE 875, first network platform 810, second network platform 880, etc.) disclosed herein with respect to system 100-400 and 600-800 can each include at least a portion of the computer 902. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914, which internal hard disk drive 914 can also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the subject disclosure.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods of the specification.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the specification can be implemented with various commercially available operating systems or combinations of operating systems.

A user can enter commands and information into the computer 902 through one or more wired/wireless input devices, e.g., a keyboard 938 and/or a pointing device, such as a mouse 940 or a touchscreen or touchpad (not illustrated, but which may be integrated into UE 104 in some embodiments). These and other input devices are often connected to the processing unit 904 through an input device interface 942 that is coupled to the system bus 908, but can be connected by other interfaces, such as a parallel port, an IEEE 1394 serial port, a game port, a USB port, an infrared (IR) interface, etc. A monitor 944 or other type of display device is also connected to the system bus 908 via an interface, such as a video adapter 946.

The computer 902 can operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 is connected to the local network 952 through a wired and/or wireless communication network interface or adapter 956. The adapter 956 can facilitate wired or wireless communication to the LAN 952, which can also include a wireless access point disposed thereon for communicating with the wireless adapter 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are example and other means of establishing a communications link between the computers can be used.

The computer 902 is operable to communicate with any wireless devices or entities operatively disposed in wireless communication, e.g., desktop and/or portable computer, server, communications satellite, etc. This includes at least WiFi and Bluetooth™ wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out; anywhere within the range of a base station. WiFi networks use radio technologies called IEEE 802.11 (a, b, g, n, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 5 GHz radio band at an 54 Mbps (802.11a) data rate, and/or a 2.4 GHz radio band at an 11 Mbps (802.11b), an 54 Mbps (802.11g) data rate, or up to an 600 Mbps (802.11n) data rate for example, or with products that contain both bands (dual band), so the networks can provide real-world performance similar to the basic 10 BaseT wired Ethernet networks used in many offices.

As employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
    a processor; and
    a memory that stores executable instructions that, when executed by the processor, facilitate performance of operations, comprising:
        receiving cell profile information representing features associated with a metro cell access point device; and
        based on the cell profile information, selecting a value for a transmission power utilized by a macro cell access point device to transmit user plane data during a defined subframe of a transmission frame that is employable to facilitate inter-cell interference coordination between the macro cell access point device and the metro cell access point device, wherein the defined subframe is a subframe associated with a variable transmission power and wherein the value is greater than zero.

2. The system of claim 1, wherein the operations further comprise:
    based on the selecting, facilitating a transmission of the user plane data from the macro cell access point device during the defined subframe.

3. The system of claim 2, wherein the transmission power is a first transmission power, the user plane data is first user plane data, the transmission is a first transmission, the defined subframe is a first subframe, and the facilitating comprises facilitating the first transmission of the first user plane data during the first subframe by employing the first transmission power and facilitating a second transmission of second user plane data during a second subframe of the transmission frame by employing a second transmission power, and wherein the metro cell access point device transmits third user plane data during the first subframe and the second subframe.

4. The system of claim 3, wherein the first transmission power is lower than the second transmission power.

5. The system of claim 1, wherein the transmission power is a first transmission power and the cell profile information comprises power data indicative of a second transmission power of the metro cell access point device.

6. The system of claim 1, wherein the cell profile information comprises antenna data indicative of a configuration of an antenna associated with the metro cell access point device.

7. The system of claim 1, wherein the cell profile information comprises location data indicative of a geographical location of the metro cell access point device.

8. The system of claim 1, wherein the cell profile information comprises capacity data indicative of a capacity of the metro cell access point device.

9. The system of claim 1, wherein the cell profile information comprises access data indicative of access control associated with the metro cell access point device.

10. The system of claim 1, wherein the selecting comprises selecting the value for the transmission power data based on mobility performance data.

11. The system of claim 1, wherein the receiving comprises receiving the cell profile information from the metro cell access point device via a communication link that employs an access point-to-access point signaling protocol.

12. A method, comprising:
    determining, by a system comprising a processor, cell profile information representing characteristics of a metro cell access point device; and
    based on the cell profile information, determining, by the system, a value for a transmission power that is employable to facilitate a transmission of first user plane data from a macro cell access point device to a first user equipment during a reduced-power subframe, during which second user plane data is to be transmitted from the metro cell access point device to a second user equipment, wherein the value is greater than zero.

13. The method of claim 12, wherein the determining the cell profile information comprises receiving the cell profile information from the metro cell access point device via communication link that employs an access point-to-access point signaling protocol.

14. The method of claim 12, wherein the determining the cell profile information comprises receiving the cell profile information from a network management device.

15. The method of claim 12, wherein the determining the cell profile information comprises determining the cell profile information representing an antenna configuration of the metro cell access point device.

16. The method of claim 12, wherein the transmission power is a first transmission power and the determining the cell profile information comprises determining the cell profile information representing a second transmission power of the metro cell access point device.

17. A machine-readable storage medium comprising executable instructions that, in response to execution, cause a system comprising a processor to perform operations, comprising:
  receiving cell profile information representing a feature of a first access point device; and
  based on the cell profile information, customizing a value of a transmission power of a second access point device to result in a customized transmission power value, wherein the customized transmission power value is utilized to facilitate a transmission of first user plane data to a first user equipment during a reduced-power subframe during which second user plane data is to be transmitted from the second access point device to a second user equipment, wherein a portion of a first coverage area of the first access point device overlaps with a second coverage area of the second access point device, and wherein the customized transmission power value is greater than zero.

18. The machine-readable storage medium of claim 17, wherein the customizing comprises reducing the value of the transmission power during the reduced-power subframe.

19. The machine-readable storage medium of claim 17, wherein the receiving comprises receiving the cell profile information from the first access point device via communication link that employs an access point-to-access point signaling protocol.

20. The machine-readable storage medium of claim 17, wherein the transmission power is a first transmission power and the cell profile information comprises power data representing a second transmission power utilized by the first access point device.

* * * * *